United States Patent
Golan et al.

(10) Patent No.: US 12,123,495 B2
(45) Date of Patent: Oct. 22, 2024

(54) SEALING VALVE

(71) Applicant: BREVEL LTD., Rehovot (IL)

(72) Inventors: Ido Golan, Rehovot (IL); Yonathan Azoulay, Rehovot (IL)

(73) Assignee: BREVEL LTD., Rehovot (IL)

( * ) Notice: Subject to any disclaimer, the term of this patent is extended or adjusted under 35 U.S.C. 154(b) by 98 days.

(21) Appl. No.: 18/020,393

(22) PCT Filed: Sep. 14, 2021

(86) PCT No.: PCT/IL2021/051118
§ 371 (c)(1),
(2) Date: Feb. 8, 2023

(87) PCT Pub. No.: WO2022/064479
PCT Pub. Date: Mar. 31, 2022

(65) Prior Publication Data
US 2023/0392690 A1    Dec. 7, 2023

(30) Foreign Application Priority Data

Sep. 22, 2020  (IL) .......................................... 277523

(51) Int. Cl.
*F16K 15/14* (2006.01)
*F16J 15/02* (2006.01)
*F16J 15/06* (2006.01)

(52) U.S. Cl.
CPC ........... *F16J 15/064* (2013.01); *F16J 15/025* (2013.01); *F16J 15/061* (2013.01); *F16J 15/062* (2013.01); *F16K 15/1402* (2021.08)

(58) Field of Classification Search
CPC ........ F16J 15/064; F16J 15/025; F16J 15/061; F16J 15/062; F16K 15/1402
See application file for complete search history.

(56) References Cited

U.S. PATENT DOCUMENTS

| | | | |
|---|---|---|---|
| 4,038,983 | A | 8/1977 | Mittleman et al. |
| 4,054,152 | A | 10/1977 | Ito et al. |
| 4,332,249 | A | 6/1982 | Joslin |
| 5,190,067 | A | 3/1993 | Paradis et al. |
| 6,053,896 | A | 4/2000 | Wilson et al. |
| 9,335,000 | B2 | 5/2016 | Selker et al. |

(Continued)

FOREIGN PATENT DOCUMENTS

| | | |
|---|---|---|
| DE | 3202796 A1 | 8/1983 |
| EP | 0901389 B1 | 9/2004 |

(Continued)

OTHER PUBLICATIONS

Minivalve; Dome valves and cross slit valves with back-up seal, how they work (patent pending). Retrieved from: http://www.minivalve.com/newsite/index.php/en/by-type/cross-slit-valves/how-they-work, on Mar. 25, 2020. 1 page.

(Continued)

*Primary Examiner* — P. Macade Nichols
(74) *Attorney, Agent, or Firm* — The Roy Gross Law Firm, LLC; Roy Gross

(57) ABSTRACT

The present invention relates to sealing valves that can be mounted between two container walls, enabling controlled fluid flow along the inner surfaces of each of the container walls, separately.

20 Claims, 19 Drawing Sheets

(56) References Cited

U.S. PATENT DOCUMENTS

| | | |
|---|---|---|
| 2006/0253084 A1 | 11/2006 | Nordgren |
| 2007/0131725 A1 | 6/2007 | Friedman |
| 2008/0185062 A1 | 8/2008 | Johannes Nijland |
| 2012/0244019 A1 | 9/2012 | Otsuka et al. |
| 2013/0041258 A1 | 2/2013 | Patrick et al. |
| 2013/0316034 A1 | 11/2013 | Bauer et al. |
| 2015/0247504 A1 | 9/2015 | Moormann et al. |
| 2016/0228689 A1 | 8/2016 | Ferguson |
| 2016/0270446 A1 | 9/2016 | Shenkal et al. |
| 2017/0030472 A1 | 2/2017 | Hall |
| 2018/0038497 A1 | 2/2018 | Veto et al. |
| 2018/0043149 A1 | 2/2018 | Martin |
| 2019/0138032 A1 | 5/2019 | Shevgoor |
| 2019/0301608 A1 * | 10/2019 | Takeda ............... F16J 15/10 |
| 2019/0358667 A1 | 11/2019 | Gaus et al. |
| 2020/0201362 A1 | 6/2020 | Shevgoor |
| 2021/0310579 A1 | 10/2021 | Maleki et al. |
| 2022/0163135 A1 | 5/2022 | Maleki et al. |

FOREIGN PATENT DOCUMENTS

| | | |
|---|---|---|
| IL | 273241 B | 8/2020 |
| JP | 2006266414 A | 10/2006 |
| WO | 2020158612 A1 | 8/2020 |

OTHER PUBLICATIONS

Minivalve; Duckbill/Umbrella combination valves, how they work. Retrieved from: http://www.minivalve.com/newsite/ index.php/en/by-type/duckbill-umbrella-combination-valves/how-they-work, on Mar. 25, 2020. 2 pages.

PCT International Search Report for International Application No. PCT/IL2021/051118, mailed Dec. 15, 2021, 3pp.

PCT Written Opinion for International Application No. PCT/IL2021/051118, mailed Dec. 15, 2021, 3pp.

PCT International Preliminary Report on Patentability for International Application No. PCT/IL2021/051118, issued Mar. 28, 2023, 4pp.

* cited by examiner

SEALING VALVE

This application is a National Phase of PCT Patent Application No. PCT/IL2021/051118 having International filing date of Sep. 14, 2021, which claims the benefit of priority of Israeli Patent Application No. 277523, filed Sep. 22, 2020, the contents of which are all incorporated herein by reference in their entirety.

FIELD OF THE INVENTION

The present invention relates to sealing valves that can be mounted between two container walls, enabling controlled fluid flow along the inner surfaces of each of the container walls, separately.

BACKGROUND OF THE INVENTION

Sealing valves are conventionally used for a wide range of applications, providing sealing functionality between two container walls that needs to be hermetically sealed. Specifically, hermetic sealing between a side-wall and a removable cover of a container is often required.

In some applications, the interior hermetically sealed cavity of the container needs to be periodically cleaned or sanitized, which may require removal of components attached to the container vessel (e.g. the container cover) to enable flow of cleaning solutions into the internal cavity of the container. Some sealing valves are integrated with valve portions, which allow fluid, such as cleaning solutions, to flow into the internal cavity of the container, in a manner that does not require removal of the seal or the cover. However, in many occasions, the sealing valves themselves may give rise to accumulation of debris in pocket-like portions that may be exposed to the external environment, thus still requiring removal of the sealing valve. In other words, due to the structures of many known sealing valves, they may get contaminated, which requires the disassembly of the container, in order to clean the contamination.

Thus, there is a need to provide sealing valves that will allow fluid flow of cleaning solutions or any other type of fluid, for example during periodic cleaning or sanitization procedures, while the sealing valve and the cover sealed thereby remain in position against the wall of the container vessel.

SUMMARY OF THE INVENTION

The present disclosure is directed toward sealing valves for directing fluids along inner surfaces of container sidewalls in a distal direction toward an internal cavity of the container, and optionally along a removable cover of the container, in the distal direction and perpendicularly to the distal direction along the removable cover inner surface. Further disclosed are sealing assemblies, including the sealing valve mounted between at least one container side-wall and a removable container cover.

According to some embodiments, there is provided a tubular seal for sealing between a wall and a cover of a cylindrical container, wherein the seal extends around a centerline and longitudinally between a proximal end and a distal end, wherein the seal comprises: a membrane juncture extending around the centerline; a first membrane extending distally from the membrane juncture; a second membrane extending radially inward from the membrane juncture; and an anchoring membrane extending radially outward from the membrane juncture; wherein when the seal is positioned between the wall and the cover and no pressure in applied there against, each of the second membrane and the anchoring membrane is configured to seal against the cover, and the first membrane is configured to seal against the wall; wherein the first membrane is made of a resilient flexible material so as to bend inward toward the centerline when flow-induced pressure gradient is applied thereto by fluid flowing in the inward direction and to spontaneously restore the sealing against the wall, when the flow-induced pressure gradient ceases; and the second membrane is made of a resilient flexible material so as to bend distally when flow-induced pressure gradient is applied thereto by fluid flowing in the distal direction and to spontaneously restore the sealing against the cover, when the flow-induced pressure gradient ceases.

According to some embodiments, the anchoring membrane is configured to seal against each of the wall and the cover.

According to some embodiments, the anchoring membrane comprises a flange configured to anchor the seal to recess in the container wall, a recess in the container cover, or both.

According to some embodiments, the flange is extending around the centerline along the anchoring membrane.

According to some embodiments, the first membrane is configured to alternately transition between a first sealing state, in which it seals against the wall when flow-induced pressure is not applied thereto and a first bent state, in which it is bent radially inward and proximally, when flow-induced pressure gradient is applied thereto by fluid flowing in the radial inward direction, for a plurality of times; and wherein the second membrane is configured to alternately transition between a second sealing state, in which it seals against the cover when flow-induced pressure is not applied thereto and a second bent state, in which it is bent radially outward and distally, when flow-induced pressure gradient is applied thereto by fluid flowing in the distal direction, for a plurality of times.

According to some embodiments, the anchoring membrane is configured to seal against each of the wall and the cover during each of the first sealing state, second sealing state, first bent state and second bent state.

According to some embodiments, the first membrane comprises a first membrane lip at its distal end and wherein the second membrane comprises a second membrane lip at its internal end, wherein each membrane lip is individually selected from the group consisting of flat membrane lip, rounded membrane lip, serrated membrane lip and square membrane lip.

According to some embodiments, the second membrane and the anchoring membrane are extending substantially along a lateral plane and the first membrane extends along a longitudinal plane, substantially perpendicular thereto.

According to some embodiments, when the seal is positioned between the wall and the cover, the second membrane and the anchoring membrane are flush with the cover along the lateral plane, and the first membrane is flush with the wall along the longitudinal plane, thereby sealing against each of the cover and the wall by the seal, when flow-induced pressure is not applied.

According to some embodiments, the first membrane is tapering distally, so that it is wider at the connection to the membrane juncture than in the first membrane lip; and the second membrane is tapering radially inward in the proximal direction, so that it is wider at the connection to the membrane juncture than in the second membrane lip.

According to some embodiments, when the seal is positioned between the wall and the cover the first membrane has an arched or v-shaped cross section, wherein each of the membrane juncture and first membrane lip is contacting the wall and a portion of the first membrane is not contacting the wall, and the second membrane has an arced or v-shaped cross section, wherein each of the membrane juncture and second membrane lip is contacting the cover and a portion of the second membrane is not contacting the cover.

According to some embodiments, the seal comprises a curvature surface extending from membrane juncture between the first membrane and the second membrane, in the direction of an internal vessel cavity of the container.

According to some embodiments, the membrane juncture comprises at least one inner channel disposed therewithin and extending along the membrane juncture. According to some embodiments, the at least one inner channel comprises a plurality of hollow inner channels. According to some embodiments, the at least one inner channel is hollow. According to some embodiments, each one of the plurality of channels is hollow.

According to some embodiments, when the sealing valve is not assembled between the wall and the cover, the first membrane is configured to extend at an angle $\beta°$ relative to the longitudinal plane and the second membrane is configured to extend at an angle $\alpha°$ relative to the lateral plane.

According to some embodiments, the anchoring membrane comprises at least one protrusion extending therefrom and around the longitudinal centerline, in the vicinity the membrane juncture.

According to some embodiments, the seal comprises at least one elastic element disposed therewithin and extending radially around the longitudinal centerline, wherein said at least one elastic element extends from a portion of the first membrane through the membrane juncture and into a portion of the second membrane.

According to some embodiments, there is provided a sealed container, comprising: a substantially cylindrical vessel comprising: a vessel floor, a vessel cover positioned substantially parallel thereto, and a substantially cylindrical vessel wall positioned perpendicular to the vessel floor and vessel cover, defining an internal cavity, wherein the cover comprises at least one cover opening and wherein the wall comprises at least one wall opening; and the tubular seal as disclosed herein, positioned between the vessel cover and the vessel wall; wherein the seal is coaxial with the vessel, wherein the proximal end thereof is in contact with the vessel cover and the distal end thereof is within the internal cavity, wherein the membrane juncture is in contact with the vessel cover, wherein the first membrane is sealing against the at least one wall opening, wherein the second membrane is sealing against the at least one cover opening, wherein the anchoring membrane is positioned out of the internal cavity; wherein the first membrane is configured to bend inward toward the centerline and the vessel cover when the flow-induced pressure gradient is applied thereto by fluid flowing there against through the at least one wall opening and to spontaneously restore the sealing against the at least one wall opening, when the flow-induced pressure gradient ceases; and the second membrane is configured to bend distally toward the vessel floor when the flow-induced pressure gradient is applied thereto by fluid flowing there against through the at least one cover opening and to spontaneously restore the sealing against the at least one cover opening, when the flow-induced pressure gradient ceases.

According to some embodiments, there is provided a sealed container, comprising: a substantially cylindrical vessel comprising: a vessel floor, a vessel cover positioned substantially parallel thereto, and a substantially cylindrical vessel wall positioned perpendicular to the vessel floor and vessel cover, defining an internal cavity, wherein the cover comprises at least one cover opening and wherein the wall comprises at least one wall opening; and a tubular seal positioned between the vessel cover and the vessel wall; wherein the seal is coaxial with the vessel and extends around a centerline and longitudinally between a proximal end, which is in contact with the vessel cover and a distal end within the internal cavity; wherein the seal comprises: a membrane juncture extending around the centerline and in contact with the vessel cover; a first membrane extending distally from the membrane juncture and sealing against the at least one wall opening; a second membrane extending radially inward from the membrane juncture and sealing against the at least one cover opening; and an anchoring membrane extending radially outward from the membrane juncture out of the internal cavity; wherein the first membrane is made of a resilient flexible material so as to bend inward toward the centerline when flow-induced pressure gradient is applied thereto by fluid flowing in the inward direction through the at least one wall opening and to spontaneously restore the sealing against the at least one wall opening, when the flow-induced pressure gradient ceases; and the second membrane is made of a resilient flexible material so as to bend distally when flow-induced pressure gradient is applied thereto by fluid flowing in the distal direction through the at least one cover opening and to spontaneously restore the sealing against the at least one cover opening, when the flow-induced pressure gradient ceases.

According to some embodiments, the sealed container is a reactor made of metal for chemical or biological reactions.

According to some embodiments, the vessel floor is connected to the cylindrical wall and the vessel cover is removable from the cylindrical wall.

According to some embodiments, the cylindrical wall comprises a plurality of wall openings, each of which is sealed by the first membrane.

According to some embodiments, the vessel cover comprises a plurality of cover openings, each of which is sealed by the second membrane.

According to some embodiments, the anchoring membrane is positioned between the vessel cover and the vessel wall.

According to some embodiments, the anchoring membrane is sealing against both the vessel cover and the vessel wall, such that an interface between the vessel cover and the vessel wall is sealed.

According to some embodiments, vessel cover comprises a cover recess at a distal surface thereof and the anchoring membrane comprises a second flange positioned at least partially within said cover recess, to anchor the seal to the container cover.

According to some embodiments, the second flange is protruding from the anchoring membrane and extending around the centerline along the anchoring membrane.

According to some embodiments, the vessel wall comprises a wall recess at a proximal end thereof and the anchoring membrane comprises a first flange positioned at least partially within said wall recess, to anchor the seal to the container wall.

According to some embodiments, first flange is protruding from the anchoring membrane and extending around the centerline along the anchoring membrane.

According to some embodiments, the first membrane is configured to alternately transition between a first sealing state, in which it seals against the at least one wall opening when flow-induced pressure is not applied thereto through the at least one wall opening, and a first bent state, in which it is bent radially inward and proximally toward the vessel cover, when flow-induced pressure gradient is applied thereto by fluid flowing through the at least one wall opening, for a plurality of times; and wherein the second membrane is configured to alternately transition between a second sealing state, in which it seals against the at least one cover opening when flow-induced pressure is not applied thereto through the at least one cover opening, and a second bent state, in which it is bent radially distally toward the vessel floor, when flow-induced pressure gradient is applied thereto by fluid flowing through the at least one cover opening, for a plurality of times.

According to some embodiments, the anchoring membrane is sealing against both the vessel cover and the vessel wall, such that an interface between the vessel cover and the vessel wall is sealed during each of the first sealing state, second sealing state, first bent state and second bent state.

According to some embodiments, the first membrane comprises a first membrane lip at its distal end, wherein when the first membrane is bent inward, the first membrane lip is not contacting the vessel wall and when the sealing against the wall is restored, the first membrane lip is contacting the vessel wall.

According to some embodiments, wherein the second membrane has an external end connected to the membrane juncture and an internal end facing the centerline, wherein the second membrane comprises a second membrane lip at its internal end, wherein when the second membrane is bent distally, the second membrane lip is not contacting the vessel cover and when the sealing against the cover is restored the second membrane lip is contacting the vessel cover.

According to some embodiments, each membrane lip is individually selected from the group consisting of flat membrane lip, rounded membrane lip, serrated membrane lip and square membrane lip.

According to some embodiments, the second membrane and the anchoring membrane are extending substantially along a lateral plane and the first membrane extends along a longitudinal plane, substantially perpendicular thereto.

According to some embodiments, when the sealing against the vessel cover is restored, the second membrane and the anchoring membrane are flush with the cover along the lateral plane, wherein when the sealing against the vessel wall is restored the first membrane is flush with the wall along the longitudinal plane, thereby sealing against each of the at least one cover opening and the at least one wall opening by the seal, when flow-induced pressure is not applied.

According to some embodiments, the first membrane is tapering distally, so that it is wider at the connection to the membrane juncture than in the first membrane lip; and wherein the second membrane is tapering radially inward in the proximal direction, so that it is wider at the connection to the membrane juncture than in the second membrane lip.

According to some embodiments, wherein the first membrane has an arched or v-shaped cross section, wherein each of the membrane juncture and first membrane lip is contacting the wall and a portion of the first membrane is not contacting the wall, and the second membrane has an arced or v-shaped cross section, wherein each of the membrane juncture and second membrane lip is contacting the cover and a portion of the second membrane is not contacting the cover.

According to some embodiments, vessel wall comprises a first membrane receiving channel, dimensioned to receive and accommodate the first membrane lip.

According to some embodiments, upon sealing of the first membrane against the at least one wall opening, the first membrane lip is accommodated within the first membrane receiving channel, and wherein upon the bending of the first membrane the first membrane lip is not accommodated within the first membrane receiving channel.

According to some embodiments, the vessel cover comprises a second membrane receiving channel, dimensioned to receive and accommodate the second membrane lip.

According to some embodiments, upon sealing of the second membrane against the at least one cover opening, the second membrane lip is accommodated within the second membrane receiving channel, and wherein upon the bending of the second membrane the second membrane lip is not accommodated within the second membrane receiving channel.

Certain embodiments of the present invention may include some, all, or none of the above advantages. Further advantages may be readily apparent to those skilled in the art from the figures, descriptions, and claims included herein. Aspects and embodiments of the invention are further described in the specification herein below and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION OF SOME EMBODIMENTS

Figure 1A:
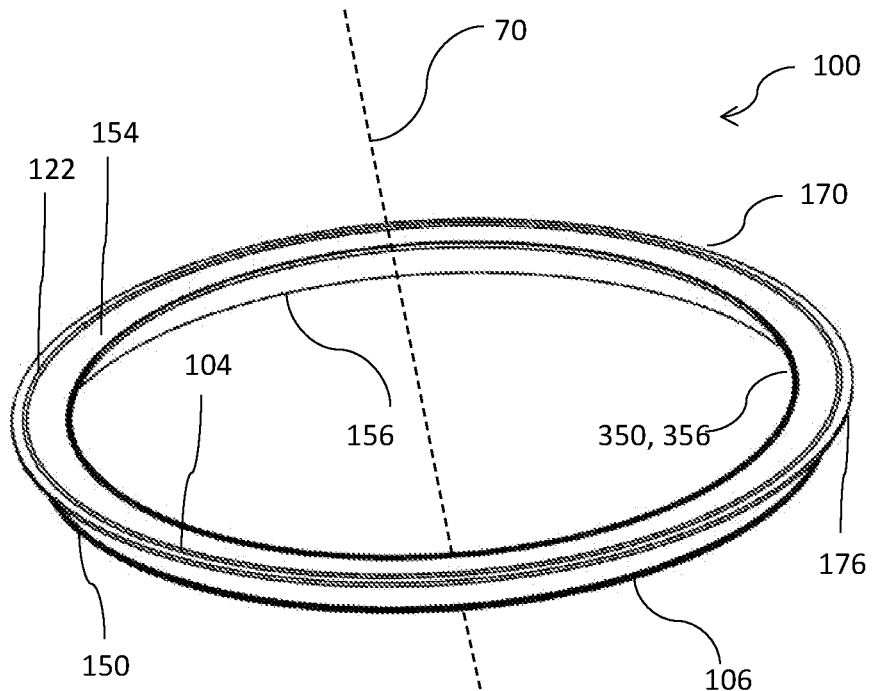
FIG. 1A shows a perspective view of a sealing valve 100 in a peripheral free state, according to some implementations.
Figure 1B:
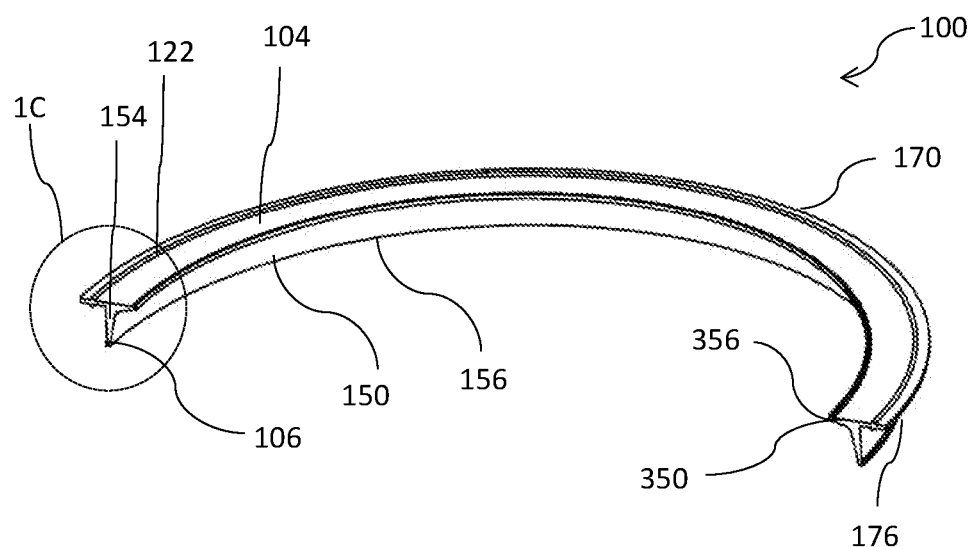
FIG. 1B shows a sectional view in perspective of the sealing valve of FIG. 1A.
Figure 1C:
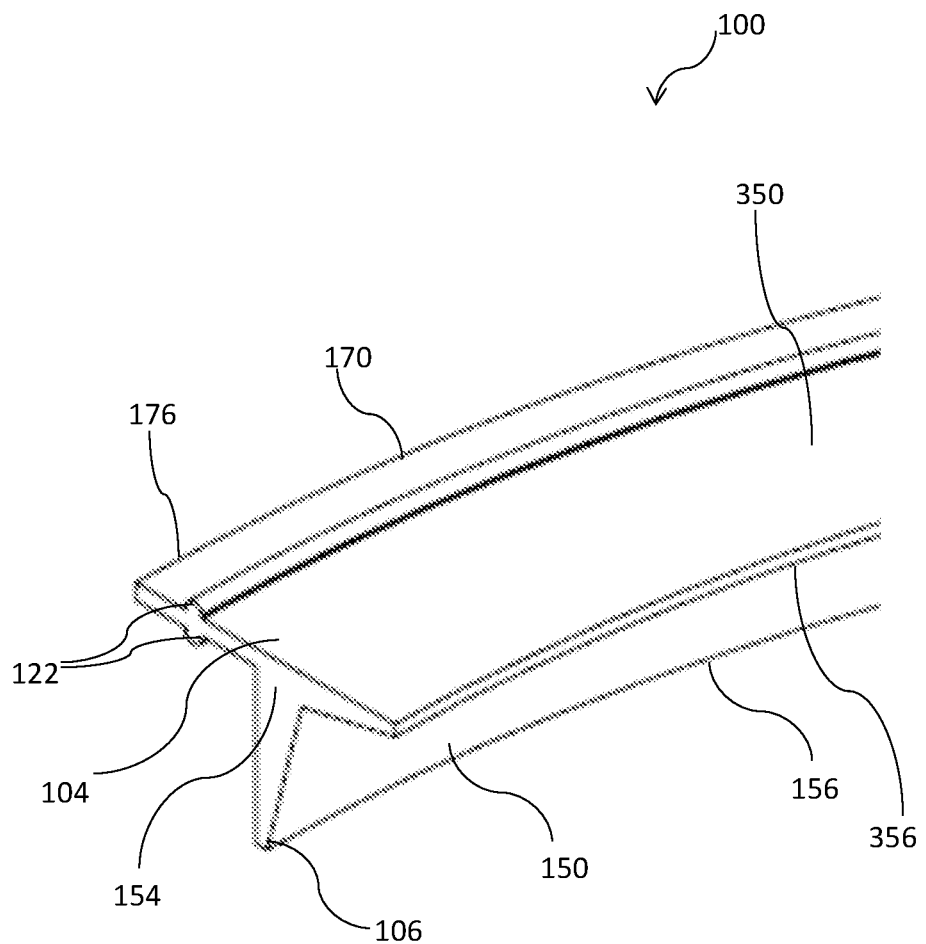
FIG. 1C constitutes a zoomed-in view of region 1C indicated in FIG. 1B.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In order to avoid undue clutter from having too many reference numbers and lead lines on a particular drawing, some components will be introduced via one or more drawings and not explicitly identified in every subsequent drawing that contains that component.

Throughout the figures of the drawings, different superscripts for the same reference numerals are used to denote different embodiments of the same elements. Embodiments of the disclosed devices and systems may include any combination of different embodiments of the same elements. Specifically, any reference to an element without a superscript may refer to any alternative embodiment of the same element denoted with a superscript.

Figure 2:
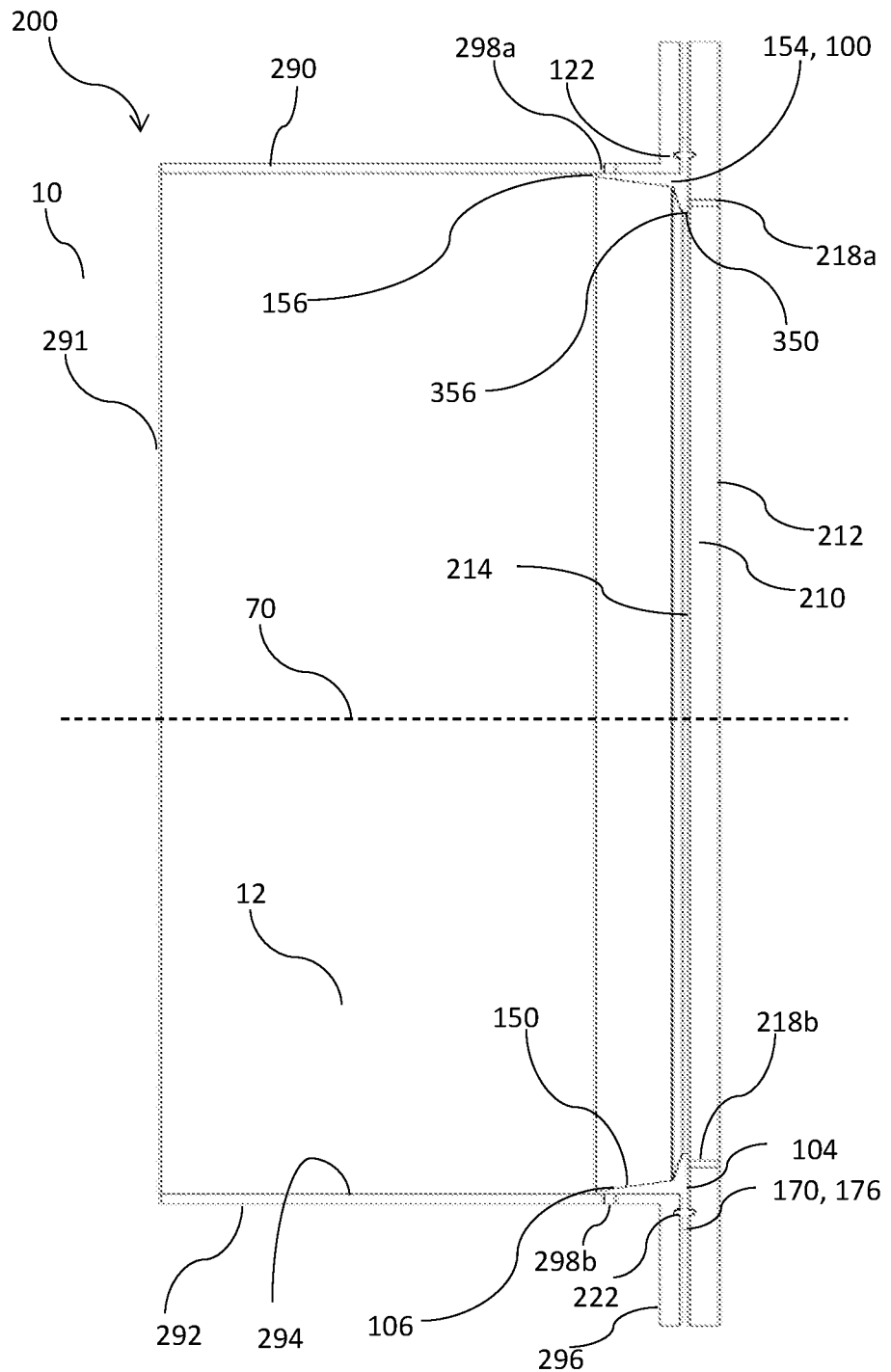
FIG. 2 shows a cross-sectional view of a container sealing assembly 200 that includes the sealing valve of FIG. 1A mounted between a container wall and a container cover, according to some implementations.

Reference is now made to FIGS. 1A-3D. FIG. 1A shows a perspective view of a sealing valve 100 in a peripheral free state, according to some implementations. FIG. 1B shows a sectional view in perspective of the sealing valve of FIG. 1A and FIG. 1C constitutes a zoomed-in view of region 1C indicated in FIG. 1B. FIG. 2 shows a cross-sectional view of a container sealing assembly 200 that includes the sealing valve of FIG. 1A mounted between a container wall and a container removable cover, according to some implementations. FIGS. 3A-3D shows cross-sectional views of the container sealing assembly of FIG. 2, according to some implementations.

The terms "including" and/or "having", as used herein, are defined as comprising (i.e., open language).

According to some embodiments, there is provided a sealing valve 100. According to some embodiments, sealing valve 100 of the present invention is intended and/or configured to be used in combination with a container having an internal cavity 12, which is preferably to be hermetically sealed from the external environment 10 during normal operation thereof, as illustrated at FIG. 2. For example, the sealed container, which is presented herein as container-sealing assembly 200, may be used for the production of any material. According to some embodiments, container-sealing assembly 200 is a reactor used in the production of a chemical or biological substance or material. According to some embodiments, container-sealing assembly 200 may be used for the growth of an organism, which may by a microorganism, such as algae, microbes and the like.

Specifically, the growth of such organisms and production of materials often presents structural challenges and requirements from the containers and reactors in which the organisms and materials are produced or stored. In particular, many of the organisms and materials require the production and storage under hermetic sealing conditions, such that the chemical or biological material does not come in contact with the air surrounding the container or reactor vessel, or with other external contaminants. Therefore, specialized inlet/outlet ports for insertion and evacuation of the chemical or biological material into and out of the vessel are usually required. Such ports, however, do not give satisfactory solution to an accompanying requirement to clean and sanitize the vessel after each use.

Biological and chemical residues remaining in the vessel after each production step or batch may give rise to contamination in later steps or batches. This can be addressed by sanitizing the sealed vessel after each use, however, the specialized inlet/outlet ports do not allow the passage of cleaning fluid to flow therethrough in a manner that both allows sufficient cleaning and maintains the ports functional for future sealed insertion and evacuation of biological and chemical matter. Therefore, the covers of such reactor or container vessels are usually opened to allow the cleaning procedure. However, frequent removals and reinstatements of such reactor vessels is burdensome and damages the sealing capability of the reactor or container.

The challenge of providing a vessel having an easy approach to cleaning fluids is addressed herein, according to some embodiments, by providing a container-sealing assembly 200 having a container cover 210, a container wall 290 and a sealing valve 100. Specifically, according to some embodiments, container-sealing assembly 200 includes cover opening(s) 218 at container cover 210 and wall opening(s) 298 at container wall 290, through which cleaning fluids may pass, in order to wash the internal vessel cavity 12 of container-sealing assembly 200. Sealing valve 100 is provided as part of container-sealing assembly 200 and is specifically designed, as detailed herein, to seal both openings, i.e. cover opening 218 and wall opening 298, according to some embodiments. Specifically, without sealing valve 100, said openings would allow access of fluids to internal vessel cavity 12 while container-sealing assembly 200 is in use (i.e. contains sensitive biological or chemical material), whereas sealing valve 100 is configured to prevent this access, while allowing fluid flow later, at the cleaning stage. Specifically, according to some embodiments, sealing valve 100 has a first membrane 150, configured to seal wall opening(s) 298, and a second membrane 350, configured to seal cover opening(s) 218, according to some embodiments. In addition, in order to allow flow of cleaning fluids into internal vessel cavity 12, each one of first membrane 150 and second membrane 350 is configured to bend away from the opening(s) it seals, when flow-induced pressure gradient is applied thereto by fluid flowing in the direction opposite from said opening(s).

The term "container" as used herein refers to any type of vessel having walls, which is configured to contain material therein. Containers, as used herein, are not limited to structures which are restricted to accommodate or encompass material, and also includes reactors, which both contain a material and allow chemical and/or biological processes to occur therein.

According to some embodiments, the container is a biological or chemical reactor.

According to some embodiments, there is provided a sealing valve 100. According to some embodiments, sealing valve 100 extends longitudinally between a proximal end 104 and a distal end 106 along a longitudinal centerline 70. According to some embodiments, sealing valve 100 is substantially round and extends radially around longitudinal centerline 70. Sealing valve 100 comprises a first membrane 150 extending from a membrane juncture 154 towards distal end 106, according to some embodiments. According to some embodiments, sealing valve 100 further comprises a second membrane 350 extending radially inward from membrane juncture 154. According to some embodiments, sealing valve 100 further comprises an anchoring membrane 170, extending radially outward from membrane juncture 154.

The terms "radially inward" or "radially outward", refer to a direction or position which is closer, or away from, respectively, a longitudinal centerline 70 (see FIGS. 1A, 2 and 3B) of sealing valve 100. In some implementations, the sealing valve 100 is coaxial with a surrounding container wall 290 of container sealing assembly, with the first membrane lip 156, with the second membrane lip 356 and/or with the anchoring membrane lip 176, all of which are described below, and at least some of which are sharing a common longitudinal centerline 70.

The term "longitudinal" refers to a direction, orientation, or measurement that is parallel to the longitudinal centerline 70.

Sealing valve 100, according to some embodiments, is specifically designed to hermetically seal containers, such as the one presented in FIG. 2. Specifically, sealing valve 100 includes both (i) first membrane 150, which is configured to seal cover opening 218, (ii) first membrane 150, which is configured to seal wall opening 298, and (iii) anchoring membrane 170, which is configured to seal between container cover 210 and container wall 290, according to some embodiments. More specifically, each one of first membrane 150, second membrane 350 and anchoring membrane 170 is extending from a membrane juncture 154, according to some embodiments, wherein anchoring membrane 170 and second membrane 350 are substantially within the same plane along membrane juncture 154, whereas first membrane 150 is rotated at an angle with respect to said plane, and extending from membrane juncture 154.

Thus, according to some embodiments, there is provided sealing valve 100 comprising second membrane 350 and anchoring membrane 170 positioned substantially along one plane and extending from membrane juncture 154, which is positioned along said plane, and first membrane 150 extending from membrane juncture 154 and is rotated with respect to said plane.

Accordingly, according to some embodiments, there is further provided a container-sealing assembly 200 comprising a container cover 210 comprising one or more cover openings 218, a container wall 290 comprising one or more wall openings 298, and a sealing valve 100 disposed therebetween. According to some embodiments, sealing valve 100 comprises anchoring membrane 170 configured to seal container cover 210 to container wall 290, first membrane 150, configured to seal one or more wall openings 298 and second membrane 350, configured to seal one or more cover openings 218.

According to some embodiments, there is further provided a container-sealing assembly 200 comprising a container cover 210 comprising one or more cover openings 218, a container wall 290 comprising one or more wall openings 298, and a sealing valve 100 disposed therebetween, wherein container wall 290 extends along a longitudinal plane and container cover 210 extends along a lateral plane substantially perpendicular to said longitudinal plane, wherein sealing valve 100 comprises anchoring membrane 170 positioned between container cover 210 and container wall 290, and sealing there between, wherein anchoring membrane 170, and a second membrane 350 of sealing valve 100 are positioned substantially along one plane, which is substantially parallel to said lateral plane, wherein second membrane 350 is sealing one or more cover openings 218, wherein sealing valve 100 comprises first membrane 150, positioned substantially along a plane, which is substantially parallel to said longitudinal plane and is sealing one or more wall openings 298. According to some embodiments, each one of first membrane 150, second membrane 350 and anchoring membrane 170 is extending from membrane juncture 154, located at the juncture of the plane of anchoring membrane 170 and second membrane 350 and the plane of first membrane 150.

According to some embodiments, when sealing valve 100 is assembled between container wall 290 and container cover 210, second membrane 350 and anchoring membrane 170 are flush with container cover 210 along the lateral plane. According to some embodiments, when sealing valve 100 is assembled within container-sealing assembly 200, second membrane 350 and anchoring membrane 170 are flush with distal cover surface 214 along the lateral plane. According to some embodiments, when sealing valve 100 is assembled between container wall 290 and container cover 210, first membrane 150 is flush with container wall 290 along the longitudinal plane. According to some embodiments, when sealing valve 100 is assembled within container-sealing assembly 200, first membrane 150 is flush with interior wall surface 294 along the lateral plane.

According to some embodiments, when sealing valve 100 is assembled within container-sealing assembly 200, first membrane 150 is flush with interior wall surface 294 along the lateral plane and second membrane 350 and anchoring membrane 170 are flush with distal cover surface 214 along the lateral plane, thereby sealing valve 100 sealing against each of container cover 210 and container wall 290, when flow-induced pressure is not applied. According to some embodiments, when sealing valve 100 is assembled between container wall 290 and container cover 210, first membrane 150 is flush with container wall 290 along the longitudinal plane, and second membrane 350 and anchoring membrane 170 are flush with container cover 210 along the lateral plane thereby sealing valve 100 sealing against each of distal cover surface 214 and interior wall surface 294, when flow-induced pressure is not applied.

The phrase "disposed therebetween", as used herein when defining the relation between sealing valve 100, container cover 210 and container wall 290, means that at least a portion of sealing valve 100 has two opposing sides, wherein one side is contacting container cover 210 and the other side is contacting container wall 290.

According to some embodiments, sealing valve 100 is a tubular seal. Therefore, sealing valve 100 may be a tubular seal a for sealing between container wall 290 and container cover 210 of a cylindrical container, according to some embodiments.

According to some embodiments, container-sealing assembly 200 comprises a substantially cylindrical vessel. As specified above, in the broadest definition, the term "container" as used herein refers to any type of vessel having walls, which is configured to contain material therein. Therefore, it is to be understood that when referring, herein and in the claims, to a "vessel wall", the term is interchangeable with "container wall" or "reactor wall", if referring to a reactor, as the same wall is typically referred. Similarly, "vessel cover" may refer to "container cover" and/or to "reactor cover", and "vessel floor" may refer to "container floor" and/or to "reactor floor".

In general, chemical reactors and bioreactors occasionally require both sealed conditions during the chemical or biological manufacturing process and careful sterilization thereafter. Therefore, such reactor may enjoy the beneficial effects of sealing valve 100, when they function as the vessel or container of container-sealing assembly 200.

Such chemical reactors and bioreactors usually have metallic enclosure, i.e. their walls, floor and cover are made of metal. However, some reactors, as well as other containers, are plastic containers, which may also require the properties of container-sealing assembly 200. The term "bioreactor" and "biological reactor", as used herein, are interchangeable. Also, a typical construction of a chemical or biological reactor includes a stirring module, such as a magnetic or mechanical stirrer for stirring the biological or chemical medium therein.

According to some embodiments, the container of container-sealing assembly 200 is a chemical or biological reactor. According to some embodiments, the container of container-sealing assembly 200 is a chemical reactor. According to some embodiments, the container of container-sealing assembly 200 is a biological reactor. According to some embodiments, the container of container-sealing assembly 200 is a biological reactor for use in the growth of an organism. According to some embodiments, the organism is a microorganism. According to some embodiments, the organism is algae.

According to some embodiments, the reactor comprises a stirring module. According to some embodiments, the stirring module is at least partially within internal vessel cavity 12. According to some embodiments, the stirring module is configured to mix a medium within internal vessel cavity 12. According to some embodiments, the medium is a chemical or biological medium. According to some embodiments, the biological medium comprises the organism specified above. According to some embodiments, the stirring module is selected from a magnetic stirrer and a mechanical stirrer. According to some embodiments, the stirring module is a magnetic stirrer. According to some embodiments, the stirring module is a mechanical stirrer.

According to some embodiments, container floor 291 is connected to the cylindrical container wall 290 and container cover 210 is removable from the cylindrical container wall 290.

According to some embodiments, the vessel comprises a container floor 291, container cover 210, positioned substantially parallel to container floor 291, and a substantially cylindrical container wall 290 positioned perpendicular to container floor 291 and container cover 210. According to some embodiments, container floor 291 is facing container cover 210 and is substantially parallel thereto. According to some embodiments, container cover 210, container floor 291 and container wall 290 collectively define internal vessel cavity 12 within the vessel.

According to some embodiments, container floor 291 is circular. According to some embodiments, container cover 210 is circular. According to some embodiments, container wall 290 has a closed cylindrical shape.

According to some embodiments, sealing valve 100 extends radially around longitudinal centerline 70 and longitudinally between proximal end 104 and distal end 106.

As detailed above sealing valve 100 comprises first membrane 150, anchoring membrane 170 and second membrane 350, according to some embodiments. As further detailed above, according to some embodiments, first membrane 150, anchoring membrane 170 and second membrane 350 are interconnected by membrane juncture 154. According to some embodiments, first membrane 150, anchoring membrane 170 and second membrane 350 are the only membranes of sealing valve 100. According to some embodiments, sealing valve 100 consists of first membrane 150, anchoring membrane 170 and second membrane 350.

According to some embodiments, membrane juncture 154 of sealing valve 100 is extending around longitudinal centerline 70. According to some embodiments, membrane juncture 154 is a radial membrane.

According to some embodiments, first membrane 150 is extending distally from membrane juncture 154. According to some embodiments, first membrane 150 is extending around longitudinal centerline 70. According to some embodiments, first membrane 150 is a radial membrane.

According to some embodiments, second membrane 350 is extending radially inward from membrane juncture 154. According to some embodiments, second membrane 350 is extending around longitudinal centerline 70. According to some embodiments, second membrane 350 is a radial membrane.

According to some embodiments, anchoring membrane 170 is extending radially outward from membrane juncture 154. According to some embodiments, anchoring membrane 170 is extending around longitudinal centerline 70. According to some embodiments, anchoring membrane 170 is a radial membrane.

According to some embodiments, sealing valve 100 is coaxial with the cylindrical container. In general, both sealing valve 100 and the container, which is to be sealed have a generally round cross section, and when sealing valve 100 is assembled to the container, it is positioned between container wall 290 and container cover 210. Specifically, when sealing valve 100 is assembled to the container, container-sealing assembly 200 is formed, wherein proximal end 104 of sealing valve 100 is in contact with the container cover 210 and distal end 106 thereof is within internal vessel cavity 12, according to some embodiments. Moreover, in container-sealing assembly 200, membrane juncture 154 membrane juncture is in contact with the container cover 210, according to some embodiments. According to some embodiments, in container-sealing assembly 200, membrane juncture 154 is also in contact with container wall 290.

According to some embodiments, when sealing valve 100 is positioned between container wall 290 and container cover 210 and no pressure in applied against sealing valve 100, each of second membrane 350 and anchoring membrane 170 is configured to seal against container cover 210. According to some embodiments, when sealing valve 100 is positioned between container wall 290 and container cover 210 and no fluid flow pressure in applied against sealing valve 100, each of second membrane 350 and anchoring membrane 170 is configured to seal against container cover 210.

According to some embodiments, when sealing valve 100 is positioned between container wall 290 and container cover 210 and no pressure in applied against sealing valve 100, first membrane 150 is configured to seal against container wall 290. According to some embodiments, when sealing valve 100 is positioned between container wall 290 and container cover 210 and no fluid flow pressure in applied against sealing valve 100, first membrane 150 is configured to seal against container wall 290. A simultaneous sealing of both first membrane 150 sealing against container wall 290 and second membrane 350 against container cover 210 is presented in FIG. 3A.

The sealing valve 100 may be made of any elastomeric material, configured to provide material resiliency and sufficient flexibility to transition between the different states of the valve disclosed herein below. It may be appreciated that the entire sealing valve 100, according to some of the implementations disclosed herein, may be formed as a monolithic structure, such as a single piece molded or otherwise manufactured structure, to reduce manufacturing costs. Alternatively, according to some embodiments, sealing valve 100 may be made of a composite material, for example, it may include a base elastomeric material and a second elastic material incorporated there within (c.f., FIG. 22).

According to some embodiments, container cover 210 comprises at least one cover opening 218. According to some embodiments, container cover 210 comprises plurality of cover openings 218. FIG. 2 is a cross sectional illustration of container-sealing assembly 200, which presents cross section of two cover openings—cover opening 218$^a$ and cover opening 218$^b$. A number of cover openings 218 may be present in container cover 210, e.g. surrounding a cover peripheral circumference. FIGS. 3A-D are concentrated on a portion of container-sealing assembly 200, in which a single cover opening 218 is present. However, the present container cover 210 is not limited to have specific number of openings.

According to some embodiments, container cover 210 has a proximal cover surface 212 and a distal cover surface 214. According to some embodiments, distal cover surface 214 is facing internal vessel cavity 12 of the container and proximal cover surface 212 is facing container external environment 10. According to some embodiments, at least one cover opening 218 extends between proximal cover surface 212 and distal cover surface 214. According to some embodiments, at least one cover opening 218 allows fluid communication between container external environment 10 and internal vessel cavity 12 when sealing valve 100 is not sealing against container cover 210. According to some embodiments, at least one cover opening 218 allows fluid communication between container external environment 10 and internal vessel cavity 12 when second membrane 350 is not sealing against at least one cover opening 218.

According to some embodiments, container wall 290 comprises at least one wall opening 298. According to some embodiments, container wall 290 comprises plurality of wall openings 218. FIG. 2 is a cross sectional illustration of container-sealing assembly 200, which presents cross section of two wall openings—wall opening 298$^a$ and wall opening 298$^b$. A number of wall openings 298 may be present in container wall 290, e.g. surrounding the wall periphery. FIGS. 3A-D are concentrated on a portion of container-sealing assembly 200, in which a single wall opening 298 is present. However, the present container wall 290 is not limited to have specific number of openings.

According to some embodiments, container wall 290 has an exterior wall surface 292 and an interior wall surface 294. According to some embodiments, interior wall surface 294 is facing internal vessel cavity 12 of the container and exterior wall surface 292 is facing container external environment 10. According to some embodiments, at least one wall opening 298 extends between proximal exterior wall surface 292 and interior wall surface 294. According to some embodiments, at least one wall opening 298 allows fluid communication therethrough between container external environment 10 and internal vessel cavity 12 when sealing valve 100 is not sealing against container cover 210. According to some embodiments, at least one wall opening 298 allows fluid communication therethrough between container external environment 10 and internal vessel cavity 12 when first membrane 150 is not sealing against at least one wall opening 298.

Figure 3A:
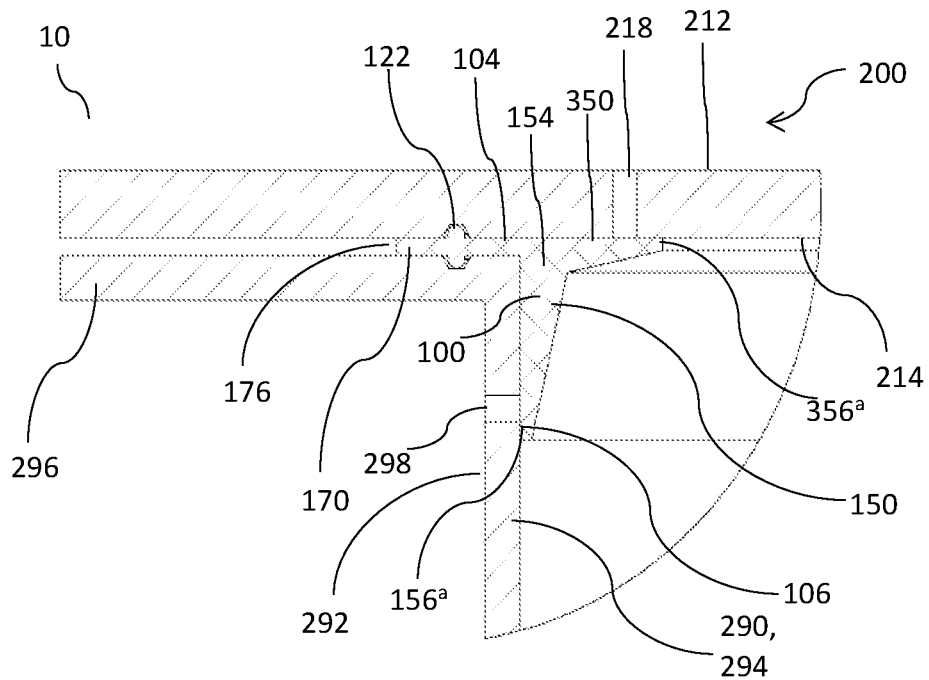
FIGS. 3A-3D show cross-sectional views of the container sealing assembly of FIG. 2, when fluid flow is not applied (FIG. 3A), when fluid flow is applied through a wall opening (FIG. 3B), when fluid flow is applied through a cover opening (FIG. 3C), and when fluid flows are applied through both a cover opening and a wall opening (FIG. 3D), according to some implementations.

FIG. 3A represents a state of container-sealing assembly 200, in which fluid flow is not applied against any of first membrane 150 or second membrane 350. In this state, according to some embodiments, first membrane 150 is sealing against container wall 290. Specifically, in this state, according to some embodiments, first membrane 150 is sealing against interior wall surface 294. More specifically, according to some embodiments, in this state, first membrane 150 is sealing against at least one wall opening 298, such that fluid communication between container external environment 10 and internal vessel cavity 12 through at least one wall opening 298 is prevented. In addition, in the state shown in FIG. 3A, according to some embodiments, second membrane 350 is sealing against container cover 210. More specifically, according to some embodiments, in this state, second membrane 350 is sealing against at least one cover opening 218, such that fluid communication between container external environment 10 and internal vessel cavity 12 through at least one cover opening 218 is prevented.

As specified above, sealing valve 100 is configured to seal a container during its operation, while allowing cleaning fluid to flow into its internal vessel cavity 12 later, at the cleaning stage. Specifically, as described, sealing valve 100 may have a first membrane 150, configured to seal wall opening(s) 298, and a second membrane 350, configured to seal cover opening(s) 218, according to some embodiments. In addition, in order to allow flow of cleaning fluids into internal vessel cavity 12, each one of first membrane 150 and second membrane 350 is configured to bend away from the opening(s) it seals, when flow-induced pressure gradient is applied thereto by fluid flowing in the direction opposite from said opening(s).

According to some embodiments, cylindrical container wall 290 comprises a plurality of wall openings 298, each of which is sealed by first membrane 150.

According to some embodiments, container cover 210 comprises a plurality of cover openings 218, each of which is sealed by second membrane 350.

Specifically, first membrane 150, according to some embodiments, is made of a resilient flexible material so as to bend inward toward longitudinal centerline 70 when flow-induced pressure gradient is applied thereto by fluid flowing in the inward direction. First membrane 150 may be made of any elastomeric material, configured to provide material resiliency and sufficient flexibility to transition between the different states thereof disclosed herein. According to some embodiments, first membrane 150 is configured to bend inward toward longitudinal centerline 70 and container cover 210 when the flow-induced pressure gradient is applied thereto by fluid flowing there against through at least one wall opening 298. This is specifically shown in FIG. 3B.

Figure 3B:
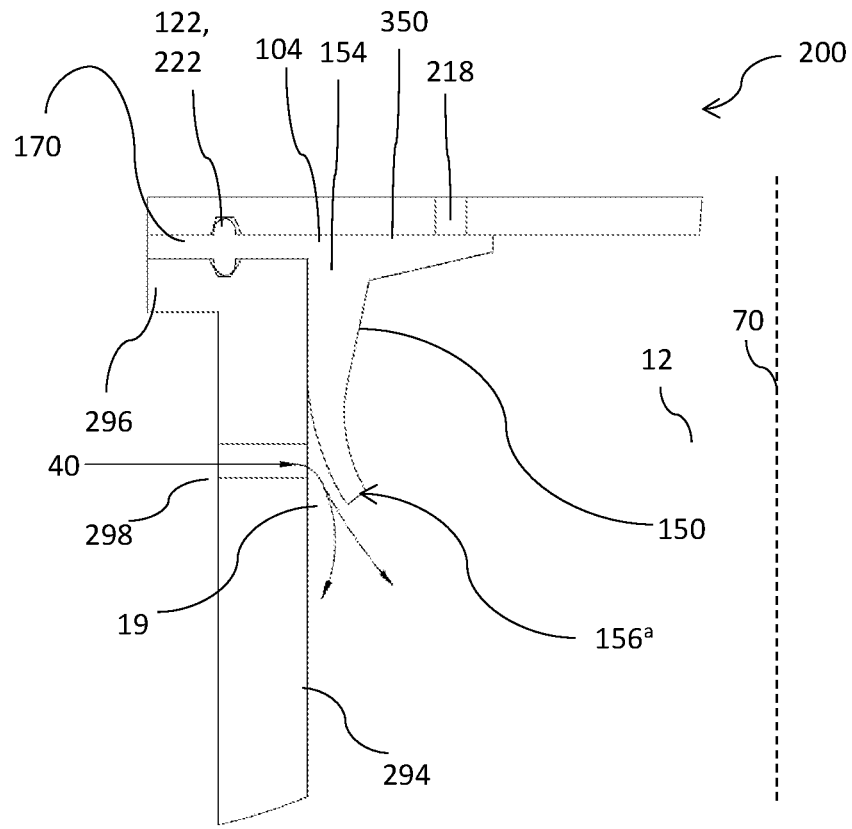

FIG. 3B represents a state of container-sealing assembly 200 in which fluid is flowing in the inward direction against first membrane 150. This is specifically represented in FIG. 3B as flow path against first membrane 40. Flow path against first membrane 40 may be of any fluid, but according to some implementations detailed above, is a flow of cleaning liquid, for cleaning the container after the most of the contained has already been removed therefrom. As specified above, cleaning of the container is generally required for the container maintenance, specifically when it is a chemical and/or biological reactor, which requires periodic removal of contaminants, which may hamper a chemical or biological process. According to some embodiments, the state of first membrane 150 represented in FIG. 3B is referred herein as the first bent state.

As shown in FIG. 3B, flow path against first membrane 40 is flowing from container external environment 10 through at least one wall opening 298 into internal vessel cavity 12. Specifically, flow path against first membrane 40 is not blocked by first membrane 150. According to some embodiments, flow path against first membrane 40 is not blocked by first membrane 150 as a result of the flexibility of first membrane 150. According to some embodiments, first membrane 150 is configured to bend inward upon flow path against first membrane 40 being applied in the inward direction. According to some embodiments, first membrane 150 is configured to bend inward upon flow path against first membrane 40 being applied in the inward direction through at least one wall opening 298.

According to some embodiments, first membrane 150 has a first membrane lip 156 located in proximity to distal end 106. According to some embodiments, first membrane 150 has a proximal and distal ends (not numbered), wherein the distal end is in proximity with distal end 106 and the proximal end is connected to membrane juncture 154. According to some embodiments, first membrane 150 has a first membrane lip 156 located at its distal end.

In the state described in FIG. 3A, wherein no fluid flow is applied against first membrane 150, first membrane lip 156 is contacting container wall 290, according to some embodiments. In the state described in FIG. 3A, first membrane lip 156 is contacting interior wall surface 294, according to some embodiments. According to some embodiments, the state of first membrane 150 described in FIG. 3A is also referred herein as the first sealing state.

In the state described in FIG. 3B, wherein flow path against first membrane 40 is applied in the inward direction through at least one wall opening 298, first membrane lip 156 is not contacting container wall 290. According to some embodiments, in the state described in FIG. 3B, first membrane lip 156 is not contacting interior wall surface 294. Specifically, in this state, first membrane lip 156 is displaced inwards towards longitudinal centerline 70, according to some embodiments. Furthermore, in the state presented in FIG. 3B, first membrane lip 156 is slightly displaced proximally, towards container cover 210, according to some embodiments.

According to some embodiments, first membrane lip 156 is selected from the group consisting of flat membrane lip 156$^a$, rounded membrane lip 156$^b$, serrated membrane lip 156$^c$ and square membrane lip 156$^d$. FIGS. 3A-D refer to an embodiment of the present invention directed to sealing valve 100 having first membrane lip 156 with a flat membrane lip 156$^a$. However, sealing valve 100 may include different type of first membrane lips 156, such as rounded membrane lip 156$^b$, as presented in FIGS. 5A-C, 6 and 9-11, serrated membrane lip 156$^c$, as presented in FIGS. 4A-C and square membrane lip 156$^d$ as presented in FIG. 4. Rounded membrane lip 156$^b$, serrated membrane lip 156$^c$ and square membrane lip 156$^d$ are detailed herein below when the relevant figure is referred together with corresponding receiving channels.

According to some embodiments, further shown in FIG. 3B, when flow path against first membrane 40 is applied in the inward direction through at least one wall opening 298, a portion of first membrane 150 is displaced inwards, thereby creating a wall passage 19 between at least one wall opening 298 and the portion of first membrane 150. In particular, according to some embodiments, when flow path against first membrane 40 is applied in the inward direction through at least one wall opening 298, a portion of first membrane 150 is displaced inwards, thereby creating a wall passage 19 between interior wall surface 294 and the portion of first membrane 150.

According to some embodiments, first membrane 150 is made of a resilient flexible material so as to bend outward toward container wall 290 when the flow-induced pressure gradient of FIG. 3B is no longer applied thereto. According to some embodiments, first membrane 150 is configured to bend outward to contact interior wall surface 294 when the flow-induced pressure gradient there against ceases. According to some embodiments, first membrane 150 is configured to spontaneously restore the sealing against container wall 290, when the flow-induced pressure gradient ceases. According to some embodiments, first membrane 150 is configured to spontaneously restore the sealing against at least one wall opening 298, when the flow-induced pressure gradient ceases. According to some embodiments, first membrane 150 is configured to spontaneously restore the sealing against interior wall surface 294, when the flow-induced pressure gradient ceases. Without wishing to be bound by any theory or mechanism of action, the sealing restoration of first membrane 150 is typically a result of the resilient flexibility of first membrane 150. According to some embodiments, first membrane 150 is configured to bend outward upon flow path against first membrane 40 ceases. When force is no longer applied to first membrane 150, for example—as no more fluid is injected through at least one wall opening 298, the resilient nature of first membrane 150 will resist flexing and revert back to the sealed state shown in FIG. 3A, to inhibit the transmission of moisture, fluids, dust, dirt, debris, etc. through at least one wall opening 298.

According to some embodiments, first membrane 150 is flush with container wall 290 along the longitudinal plane when the flow-induced pressure gradient is no longer applied thereto. According to some embodiments, first membrane 150 is flush with container wall 290 along the longitudinal plane when the flow-induced pressure gradient there against ceases. According to some embodiments, first membrane 150 is flush with interior wall surface 294 along the longitudinal plane when the flow-induced pressure gradient is no longer applied thereto. According to some embodiments, first membrane 150 is flush with interior wall surface 294 along the longitudinal plane when the flow-induced pressure gradient there against ceases.

According to some embodiments, when sealing valve 100 is assembled within container-sealing assembly 200, first membrane 150 is flush with interior wall surface 294 along the lateral plane and second membrane 350 and anchoring membrane 170 are flush with distal cover surface 214 along the lateral plane, thereby sealing valve 100 sealing against each of container cover 210 and container wall 290, when flow-induced pressure is not applied. According to some embodiments, when sealing valve 100 is assembled between container wall 290 and container cover 210, first membrane 150 is flush with container wall 290 along the longitudinal plane, and second membrane 350 and anchoring membrane 170 are flush with container cover 210 along the lateral plane thereby sealing valve 100 sealing against each of distal cover surface 214 and interior wall surface 294, when flow-induced pressure is not applied.

According to some embodiments, first membrane 150 is configured to alternately transition between a first sealing state, in which it seals against container wall 290 when flow-induced pressure is not applied thereto and a first bent state, in which it is bent radially inward and proximally, when flow-induced pressure gradient is applied thereto by fluid flowing in the radial inward direction.

According to some embodiments, first membrane 150 is configured to alternately transition between a first sealing state and a first bent state. According to some embodiments, first membrane 150 is configured to alternately transition between a first sealing state and a first bent state for a plurality of occurrences. According to some embodiments, transition from the first sealing date to the first bent state occurs when flow-induced pressure gradient is applied against first membrane 150 by fluid flowing in the inward direction. According to some embodiments, transition from the first bent date to the first sealing state occurs when said flow-induced pressure gradient against first membrane 150 ceases.

According to some embodiments, first membrane 150 is configured to bend inward toward longitudinal centerline 70 and container cover 210 upon transition from the first sealing state to the first bent state. According to some embodiments, first membrane 150 is configured to bend inward upon flow path against first membrane 40 being applied in the inward direction through at least one wall opening 298 and transition from the first sealing state to the first bent state. According to some embodiments, upon transition from the first sealing state to the first bent state first membrane lip 156 is displaced inwards towards longitudinal centerline 70, according to some embodiments. According to some embodiments, upon transition from the first sealing state to the first bent state first membrane lip 156 is slightly displaced proximally, towards container cover 210, according to some embodiments. According to some embodiments, upon transition from the first sealing state to the first bent state a portion of first membrane 150 is displaced inwards, thereby creating a wall passage 19 between at least one wall opening 298 and the portion of first membrane 150. According to some embodiments, upon transition from the first sealing state to the first bent state, a portion of first membrane 150 is displaced inwards, thereby creating a wall passage 19 between interior wall surface 294 and the portion of first membrane 150. According to some embodiments, said portion of first membrane 150 comprises first membrane lip 156.

According to some embodiments, first membrane 150 is made of a resilient flexible material so as to bend outward toward container wall 290 upon transition from the first bent state to the first sealing state. According to some embodiments, first membrane 150 is configured to bend outward to contact interior wall surface 294 upon transition from the first bent state to the first sealing state. According to some embodiments, first membrane 150 is configured to spontaneously restore the sealing against container wall 290, upon transition from the first bent state to the first sealing state. According to some embodiments, first membrane 150 is configured to spontaneously restore the sealing against at least one wall opening 298, upon transition from the first bent state to the first sealing state. According to some embodiments, first membrane 150 is configured to spontaneously restore the sealing against interior wall surface 294, upon transition from the first bent state to the first sealing state.

According to some embodiments, in the first sealing state first membrane 150 is sealing against container wall 290. According to some embodiments, in the first sealing state first membrane 150 is sealing against at least one wall opening 298. According to some embodiments, in the first sealing state first membrane 150 is sealing against interior wall surface 294. According to some embodiments, in the first sealing state first membrane lip 156 is contacting container wall 290. According to some embodiments, in the first sealing state first membrane lip 156 is contacting interior wall surface 294. According to some embodiments, in the first sealing state flow path against first membrane 40 is blocked by first membrane 150. According to some embodiments, in the first sealing state first membrane 150 is flush with container wall 290 along the longitudinal plane. According to some embodiments, in the first sealing state first membrane 150 is flush with interior wall surface 294 along the longitudinal plane.

According to some embodiments, in the first bent state first membrane 150 is not sealing against container wall 290. According to some embodiments, in the first bent state first membrane 150 is not sealing against at least one wall opening 298. According to some embodiments, in the first bent state first membrane 150 is not sealing against interior wall surface 294. According to some embodiments, in the first bent state first membrane lip 156 is not contacting container wall 290. According to some embodiments, in the first bent state first membrane lip 156 is not contacting interior wall surface 294. According to some embodiments, in the first bent state flow path against first membrane 40 is not blocked by first membrane 150.

According to some embodiments, first membrane 150 is tapering radially distally. This is specifically portrayed, e.g. in FIGS. 3A-D. Specifically, according to some embodiments, first membrane 150 is wider at the connection to membrane juncture 154 than in first membrane lip 156, according to some embodiments. As detailed above, according to some embodiments, first membrane 150 has a proximal and distal ends (not numbered), wherein the distal end is in proximity with distal end 106 and the proximal end is connected to membrane juncture 154. According to some embodiments, the proximal end of first membrane 150 is wider that the distal end thereof. According to some embodiments, the maximal width of first membrane 150 is in its proximal end. According to some embodiments, first membrane 150 has a midsection between the proximal and distal ends thereof. According to some embodiments, the proximal end of first membrane 150 is wider than the midsection thereof. Without wishing to be bound by any theory or mechanism of action, it is suggested that the tapering configuration of first membrane 150 is contributing to its ability to make a spontaneous transition from its bent configuration outward back toward container wall 290 (i.e. from the first bent state to the first sealed state) when the flow-induced pressure gradient is no longer applied thereto.

According to some embodiments, first membrane 150 and second membrane 350 share several common features. According to some embodiments, first membrane 150 and second membrane 350 are made of the same material. Second membrane 350, according to some embodiments, is made of a resilient flexible material so as to bend distally toward container floor 291 when flow-induced pressure gradient is applied thereto by fluid flowing in the distal direction. Second membrane 350 may be made of any elastomeric material, configured to provide material resiliency and sufficient flexibility to transition between the different states thereof disclosed herein. According to some embodiments, second membrane 350 is configured to bend distally toward container floor 291 and container wall 290 when the flow-induced pressure gradient is applied thereto by fluid flowing there against through at least one cover opening 218. This is specifically shown in FIG. 3C.

Figure 3C:
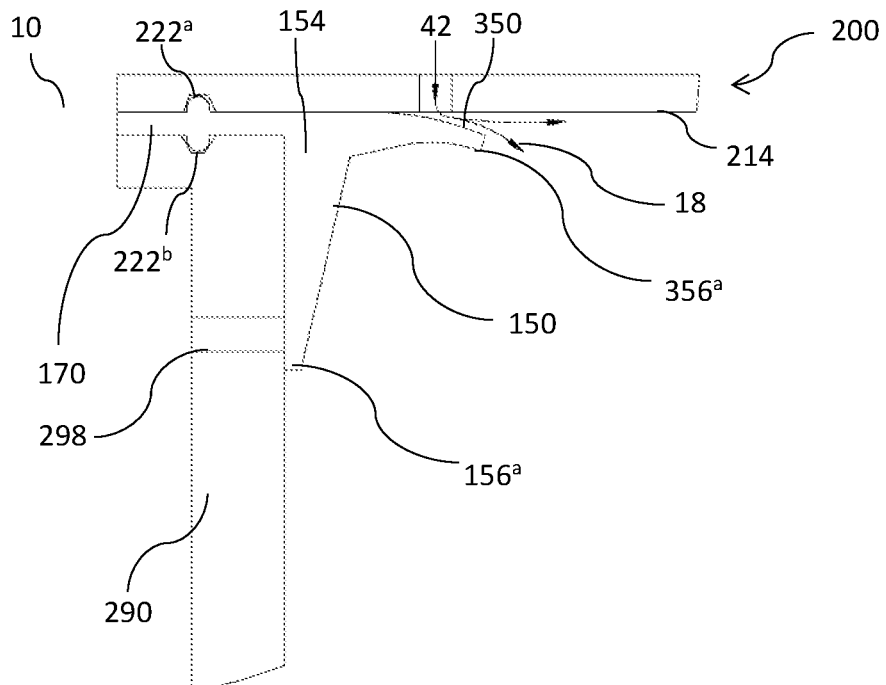

FIG. 3C represents a state of container-sealing assembly 200 in which fluid is flowing in the distal direction against second membrane 350. This is specifically represented in FIG. 3C as flow path against second membrane 42. Flow path against second membrane 42 may be of any fluid, but according to some implementations detailed above, is a flow of cleaning liquid, for cleaning the container after the most of the contained has already been removed therefrom. As specified above, cleaning of the container is generally required for the container maintenance, specifically when it is a chemical and/or biological reactor, which requires periodic removal of contaminants, which may hamper a chemical or biological process. According to some embodiments, the state of second membrane 350 represented in FIG. 3C is referred herein as the second bent state.

As shown in FIG. 3C, flow path against second membrane 42 is flowing from container external environment 10 through at least one cover opening 218 into internal vessel cavity 12. Specifically, flow path against second membrane 42 is not blocked by second membrane 350. According to some embodiments, second membrane 350 is not blocked by second membrane 350 as a result of the flexibility of second membrane 350. According to some embodiments, second membrane 350 is configured to bend distally upon flow path against second membrane 42 being applied in the distal direction. According to some embodiments, second membrane 350 is configured to bend distally upon flow path against second membrane 42 being applied in the distal direction through at least one cover opening 218.

According to some embodiments, second membrane 350 has a second membrane lip 356 located distally from membrane juncture 154. According to some embodiments, second membrane 350 has an internal and external ends (not numbered), wherein the internal end is facing longitudinal centerline 70 and the external end is connected to membrane juncture 154. According to some embodiments, second membrane 350 has a first membrane lip 156 located at its internal end.

In the state described in FIG. 3A, wherein no fluid flow is applied against first second membrane 350, second membrane lip 356 is contacting container cover 210, according to some embodiments. In the state described in FIG. 3A, second membrane lip 356 is contacting distal cover surface 214, according to some embodiments. According to some embodiments, the state of second membrane 350 described in FIG. 3A is also referred herein as the second sealing state.

In the state described in FIG. 3C, wherein flow path against second membrane 42 is applied in the distal direction through at least one cover opening 218, second membrane lip 356 is not contacting container cover 210. According to some embodiments, in the state described in FIG. 3C, second membrane lip 356 is not contacting distal cover surface 214. Specifically, in this state, second membrane lip 356 is displaced distally towards container floor 291, according to some embodiments. Furthermore, in the state presented in FIG. 3C, second membrane lip 356 is slightly displaced outwards, towards container wall 290, according to some embodiments.

According to some embodiments, second membrane lip 356 is selected from the group consisting of flat membrane lip $356^a$, rounded membrane lip $356^b$, serrated membrane lip $356^c$ and square membrane lip $356^d$. FIGS. 3A-D refer to an embodiment of the present invention directed to sealing valve 100 having second membrane lip 356 with a flat membrane lip $356^a$. However, sealing valve 100 may include different types of second membrane lip 356, such as rounded membrane lip $356^b$, as presented in FIGS. 5A-C, 6 and 9-11, serrated membrane lip $356^c$, as presented in FIGS. 4A-C and square membrane lip $356^d$ as presented in FIG. 4. Rounded membrane lip $356^b$, serrated membrane lip $356^c$ and square membrane lip $356^d$ are detailed herein below when the relevant figure is referred together with corresponding receiving channels.

Although the figures accompanying the present disclosure are presenting sealing valves 100 having first membrane lip 156, which matches in shape with second membrane lip 356, the present invention also encompassed non-identical first membrane lip 156 and second membrane lip 356 pairs, according to some embodiments. For example, sealing valve 100 may include first membrane 150 having first flat membrane lip $156^a$ and second rounded membrane lip $356^b$, according to some embodiments.

According to some embodiments, further shown in FIG. 3C, when flow path against second membrane 42 is applied in the distal direction through at least one cover opening 218, a portion of second membrane 350 displaced distally, thereby creating a cover passage 18 between at least one cover opening 218 and the portion of second membrane 350. In particular, according to some embodiments, when flow path against second membrane 42 is applied in the distal direction through at least one cover opening 218, a portion of second membrane 350 is displaced distally, thereby creating a cover passage 18 between distal cover surface 214 and the portion of second membrane 350. According to some embodiments, said portion of second membrane 350 comprises second membrane lip 356.

According to some embodiments, second membrane 350 is made of a resilient flexible material so as to bend proximally toward container cover 210 when the flow-induced pressure gradient of FIG. 3C is no longer applied thereto. According to some embodiments, second membrane 350 is configured to bend proximally to contact distal cover surface 214 when the flow-induced pressure gradient there against ceases. According to some embodiments, second membrane 350 is configured to spontaneously restore the sealing against container cover 210, when the flow-induced pressure gradient ceases. According to some embodiments, second membrane 350 configured to spontaneously restore the sealing against at least one cover opening 218, when the flow-induced pressure gradient ceases. According to some embodiments, second membrane 350 is configured to spontaneously restore the sealing against distal cover surface 214, when the flow-induced pressure gradient ceases. Without wishing to be bound by any theory or mechanism of action, the sealing restoration of second membrane 350 is typically a result of the resilient flexibility of second membrane 350. According to some embodiments, second membrane 350 is configured to bend proximally upon flow path against second membrane 42 ceasing. When force is no longer applied to second membrane 350, for example—as no more fluid is injected through at least one cover opening 218, the resilient nature of second membrane 350 will resist flexing and revert back to the sealed state shown in FIG. 3A, to inhibit the transmission of moisture, fluids, dust, dirt, debris, etc. through at least one cover opening 218.

According to some embodiments, second membrane 350 is flush with container cover 210 along the lateral plane when the flow-induced pressure gradient is no longer applied thereto. According to some embodiments, second membrane 350 is flush with container cover 210 along the lateral plane when the flow-induced pressure gradient there against ceases. According to some embodiments, second membrane 350 is flush with distal cover surface 214 294 along the lateral plane when the flow-induced pressure gradient is no longer applied thereto. According to some embodiments, second membrane 350 is flush with distal cover surface 214 along the lateral plane when the flow-induced pressure gradient there against ceases.

Figure 3D:
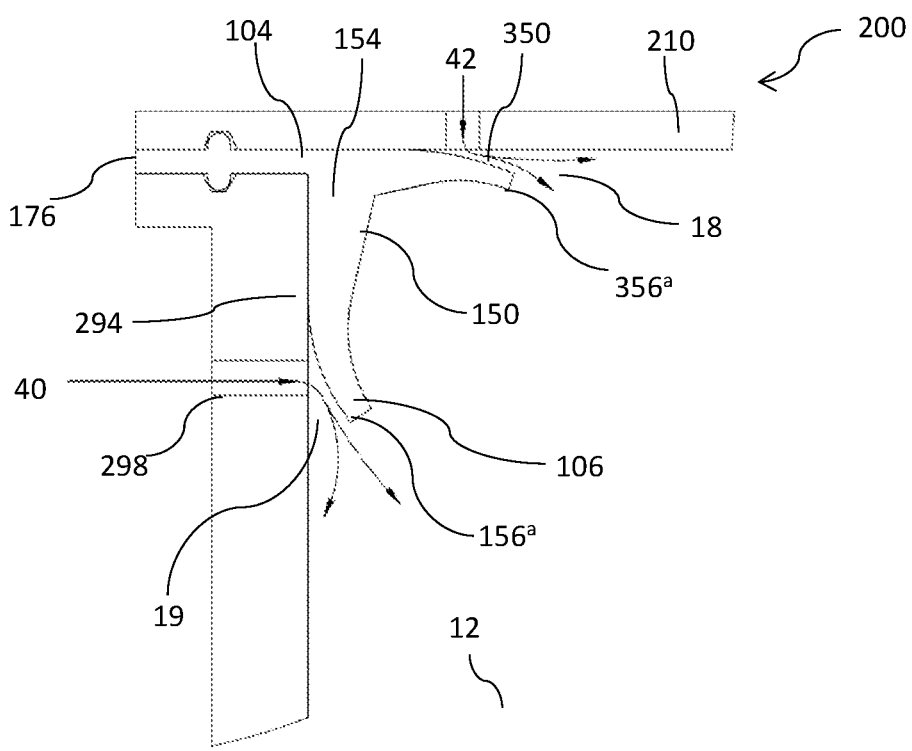

FIG. 3D represent a state, wherein flow path against second membrane 42 is applied in the distal direction through at least one cover opening 218 and the flow path against first membrane 40 is applied in the inward direction through at least one wall opening 298. The effect on sealing valve 100 is elaborated above, when discussing FIGS. 3B and 3C. According to some embodiments, the state of second membrane 350 described in FIG. 3D is similar to the state of second membrane 350 in FIG. 3C and is also referred herein as the second bent state. According to some embodiments, the state of first membrane 150 described in FIG. 3D is similar to the state of first membrane 150 in FIG. 3B and is also referred herein as the first bent state.

According to some embodiments, second membrane 350 is configured to alternately transition between a second sealing state, in which it seals against container cover 210 when flow-induced pressure is not applied thereto and a second bent state, in which it is bent distally and radially outward, when flow-induced pressure gradient is applied thereto by fluid flowing in the distal direction.

According to some embodiments, second membrane 350 is configured to alternately transition between a second sealing state and a second bent state. According to some embodiments, second membrane 350 is configured to alternately transition between a second sealing state and a second bent state for a plurality of occurrences. According to some embodiments, transition from the second sealing date to the second bent state occurs when flow-induced pressure gradient is applied against second membrane 350 by fluid flowing in the distal direction. According to some embodiments, transition from the second bent date to the second sealing state occurs when said flow-induced pressure gradient against second membrane 350 ceases.

According to some embodiments, second membrane 350 is configured to bend distally toward longitudinal centerline 70 and container cover 210 upon transition from the second sealing state to the second bent state. According to some embodiments, second membrane 350 is configured to bend distally upon flow path against second membrane 42 being applied in the distal direction through at least one cover opening 218 and transition from the second sealing state to the second bent state. According to some embodiments, upon transition from the second sealing state to the second bent state second membrane lip 356 is displaced distally towards container floor 291, according to some embodiments. According to some embodiments, upon transition from the second sealing state to the second bent state second membrane lip 356 is slightly displaced outwards towards container wall 290, according to some embodiments. According to some embodiments, upon transition from the second sealing state to the second bent state a portion of second membrane 350 displaced distally, thereby creating a cover passage 18 between at least one cover opening 218 and the portion of second membrane 350. According to some embodiments, upon transition from the second sealing state to the second bent state, a portion of second membrane 350 is displaced distally, thereby creating a cover passage 18 between distal cover surface 214 and the portion of second membrane 350.

According to some embodiments, second membrane 350 is made of a resilient flexible material so as to bend proximally toward container cover 210 upon transition from the second bent state to the second sealing state. According to some embodiments, second membrane 350 is configured to bend proximally to contact distal cover surface 214 upon transition from the second bent state to the second sealing state. According to some embodiments, second membrane 350 is configured to spontaneously restore the sealing against 210, upon transition from the second bent state to the second sealing state. According to some embodiments, second membrane 350 is configured to spontaneously restore the sealing against at least one cover opening 218, upon transition from the second bent state to the second sealing state. According to some embodiments, second membrane 350 is configured to spontaneously restore the sealing against distal cover surface 214, upon transition from the second bent state to the second sealing state.

According to some embodiments, in the second sealing state second membrane 350 is sealing against container cover 210. According to some embodiments, in the second sealing state second membrane 350 is sealing against at least one cover opening 218. According to some embodiments, in the second sealing state second membrane 350 is sealing against distal cover surface 214. According to some embodiments, in the second sealing state second membrane lip 356 is contacting container cover 210. According to some embodiments, in the second sealing state second membrane lip 356 is contacting distal cover surface 214. According to some embodiments, in the second sealing state flow path against second membrane 42 is blocked by second membrane 350. According to some embodiments, in the second sealing state first membrane second membrane 350 is flush with container cover 210 along the lateral plane. According to some embodiments, in the second sealing state second membrane 350 is flush with distal cover surface 214 along the lateral plane.

According to some embodiments, in the second bent state second membrane 350 is not sealing against container cover 210. According to some embodiments, in the second bent state second membrane 350 is not sealing against at least one cover opening 218. According to some embodiments, in the second bent state second membrane 350 is not sealing against distal cover surface 214. According to some embodiments, in the second bent state second membrane lip 356 is not contacting container cover 210. According to some embodiments, in the second bent state second membrane lip 356 is not contacting distal cover surface 214. According to some embodiments, in the second bent state flow path against second membrane 42 is not blocked by first membrane 150.

According to some embodiments, second membrane 350 is tapering inward. This is specifically portrayed, e.g. in FIGS. 3A-D. Specifically, according to some embodiments, second membrane 350 wider at the connection to membrane juncture 154 than in second membrane lip 356, according to some embodiments. As detailed above, according to some embodiments, second membrane 350 has an internal and external ends (not numbered), wherein the internal end is facing longitudinal centerline 70 and the external end is connected to membrane juncture 154. According to some embodiments, the external end of second membrane 350 is wider that the internal end thereof. According to some embodiments, the maximal width of second membrane 350 is in its external end. According to some embodiments, second membrane 350 has a midsection between the internal and external ends thereof. According to some embodiments, the proximal end of first membrane 150 is wider than the midsection thereof. Without wishing to be bound by any theory or mechanism of action, it is suggested that the tapering configuration of second membrane 350 is contributing to its ability to make a spontaneous transition from its bent configuration proximally back toward container cover 210 (i.e. from the second bent state to the second sealed state) when the flow-induced pressure gradient is no longer applied thereto.

As further shown in FIGS. 1-3, anchoring membrane 170 may be positioned between container cover 210 and container wall 290. Specifically, anchoring membrane 170 may be positioned between container cover 210 and the end of container wall 290, which is proximal to container cover 210, according to some embodiments. According to some embodiments, container wall 290 has a proximal end facing container cover 210 and a distal end facing container floor 291, wherein anchoring membrane 170 is positioned between container cover 210 and the proximal end of container wall 290. As further shown in FIGS. 1-3, anchoring membrane 170 is, according to some embodiments, positioned at least partially out of internal vessel cavity 12 of the container. According to some embodiments, anchoring membrane 170 is positioned substantially out of internal vessel cavity 12 of the container. According to some embodiments, anchoring membrane 170 is positioned fully out of internal vessel cavity 12 of the container.

Figure 9:
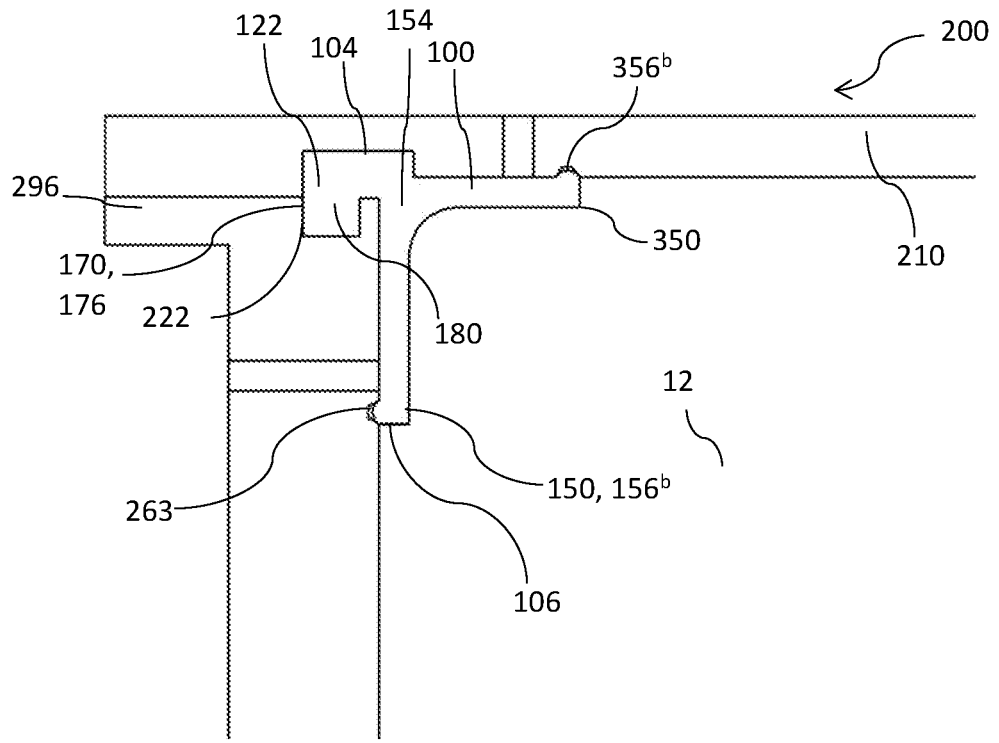
FIG. 9 shows a cross-sectional view of a container sealing assembly 200 that includes a sealing valve 100 provided with round-shaped membrane lips and a protruded anchoring membrane, mounted between a container wall and a container cover provided with membrane receiving channels, according to some implementations.
Figure 10:
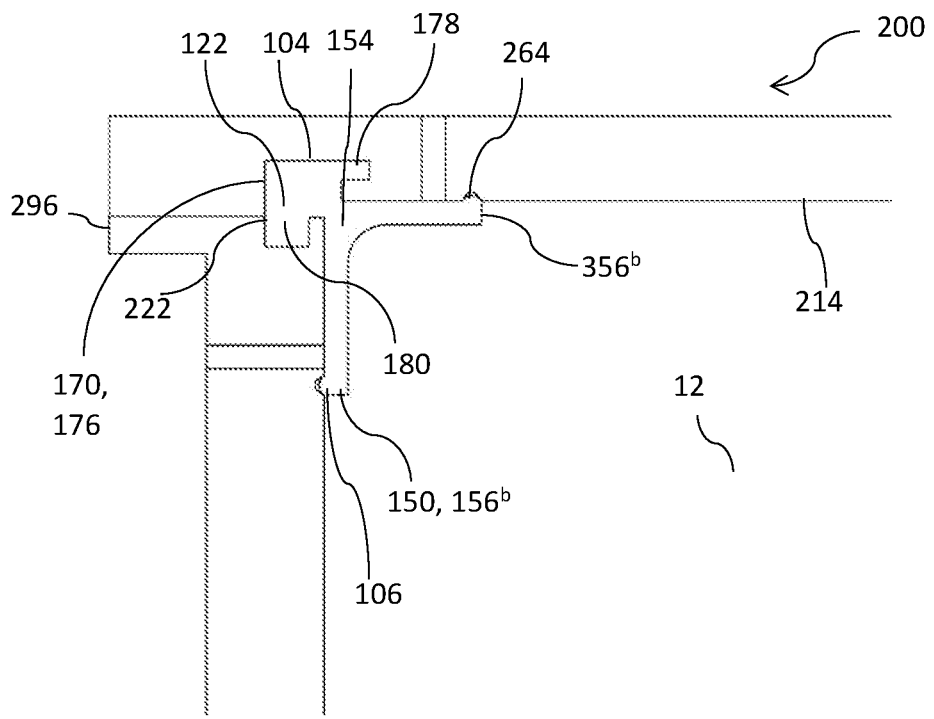
FIG. 10 shows a cross-sectional view of a container sealing assembly 200 that includes a sealing valve 100 provided with round-shaped membrane lips and a protruded anchoring membrane, mounted between a container wall and a container cover provided with membrane receiving channels, according to some implementations.

According to some embodiments, at least one seal flange 122 is extending around longitudinal centerline 70 along the anchoring membrane 170. According to some embodiments, at least one seal flange 122 is protruding from the anchoring membrane 170 and extending around longitudinal centerline 70 along anchoring membrane 170. FIGS. 9 and 10 are detailed below and describe embodiment directed to anchoring membrane second protrusion 178 and anchoring membrane first protrusion 180.

According to some embodiments, anchoring membrane 170 is configured to seal against each of container wall 290 and container cover 210. According to some embodiments, when sealing valve 100 is assembled, anchoring membrane 170 is sealing against both container wall 290 and container cover 210, such that an interface between container wall 290 and container cover 210 is sealed.

According to some embodiments, anchoring membrane 170 is a flat membrane configured to seal against two parallel surfaces, where positioned there between. According to some embodiments, anchoring membrane 170 is a flat membrane configured to seal against two parallel surfaces, where positioned there between and wherein each of the surfaces is pressing against anchoring membrane 170.

In embodiments detailed above, it is described how fluid flow is effecting the conformations of first membrane 150 and second membrane 350. Anchoring membrane 170, however, is generally affixed between container cover 210 and container wall 290 when assembled, and therefore, anchoring membrane 170 is not affected by such fluid flow, according to some embodiments.

According to some embodiments, anchoring membrane 170 is configured to seal against each of container wall 290 and container cover 210 during each of the first sealing state, second sealing state, first bent state and second bent state. According to some embodiments, anchoring membrane 170 is sealing against each of container wall 290 and container cover 210 during each of the first sealing state, second sealing state, first bent state and second bent state.

According to some embodiments, anchoring membrane 170 is flush with container cover 210. According to some embodiments, anchoring membrane 170 is flush with distal cover surface 214. According to some embodiments, anchoring membrane 170 is flush with container cover 210 during each of the first sealing state, second sealing state, first bent state and second bent state. According to some embodiments, anchoring membrane 170 is flush with distal cover surface 214 during each of the first sealing state, second sealing state, first bent state and second bent state FIGS. 1-3 also show a means of affixing sealing valve 100 to the container. Specifically, affixing sealing valve 100 to the container may be achieved through a seal flange(s) 122, extending from anchoring membrane 170, which is inserted into container recess(es) 222 in container cover 210 and/or container wall 290.

According to some embodiments, sealing valve 100 comprises at least one seal flange 122. According to some embodiments, sealing valve 100 comprises at least one seal flange 122 extending from anchoring membrane 170. According to some embodiments, anchoring membrane 170 is connected to at least one seal flange 122 which is extending therefrom.

According to some embodiments, at least one seal flange 122 is extending longitudinally from anchoring membrane 170. According to some embodiments, at least one seal flange 122 is substantially parallel to first membrane 150. According to some embodiments, at least one seal flange 122 is substantially perpendicular to anchoring membrane 170. According to some embodiments, at least one seal flange 122 is extending distally or proximally from anchoring membrane 170. According to some embodiments, at least one seal flange 122 is extending distally from anchoring membrane 170. According to some embodiments, at least one seal flange 122 is extending proximally from anchoring membrane 170. According to some embodiments, at least one seal flange 122 has two portions, one of which is extending distally from anchoring membrane 170 and the other is extending proximally from anchoring membrane 170, as shown in FIGS. 1-3. Thus, according to some embodiments, anchoring membrane 170 comprises at least one seal flange 122, configured to anchor the sealing valve 100 to recess $222^b$ in container wall 290, to recess $222^a$ in the container cover 210, or both. Recess $222^b$ in container wall 290 and recess $222^a$ in the container cover 210 are specifically numbered and referred in FIG. 3C.

According to some embodiments, container cover 210 comprises at least one cover recess $222^a$. According to some embodiments, container wall 290 comprises at least one wall recess $222^b$.

In FIG. 3C seal flange 122 is extending proximally from anchoring membrane 170 to penetrate into recess $222^a$ in the container cover 210, and distally from anchoring membrane 170 to penetrate into recess $222^b$ in the container wall 290. Specifically, as shown in this Figure, container cover 210 may comprise cover recess $222^a$ at distal cover surface 214, and anchoring membrane 170 may comprise at least one seal flange 122, extending proximally therefrom, wherein at least one seal flange 122 is positioned at least partially within cover recess $222^a$, to anchor sealing valve 100 to container cover 210. As further shown in this Figure, container wall 290 may comprise wall recess $222^b$ at the proximal end thereof, and at least one seal flange 122 may be extending also proximally from anchoring membrane 170, wherein at least one seal flange 122 is positioned at least partially within wall recess $222^b$, to anchor sealing valve 100 to container cover 210.

According to some embodiments, sealing valve 100 comprises a single seal flange 122. According to some embodiments, sealing valve 100 comprises a single seal flange 122 extending from anchoring membrane 170. According to some embodiments, anchoring membrane 170 is connected to seal flange 122, which is extending therefrom. According to some embodiments, seal flange 122 is extending longitudinally from anchoring membrane 170 distally and/or proximally. According to some embodiments, container cover 210 comprises one cover recess $222^a$. According to some embodiments, container wall 290 comprises one wall recess $222^b$.

According to some embodiments, anchoring membrane 170 comprises a single seal flange 122, configured to anchor the sealing valve 100 to recess $222^b$ in container wall 290, to recess $222^a$ in the container cover 210, or both. According to some embodiments, sealing valve 100 comprises a single seal flange 122, extending distally from anchoring membrane 170 and configured to anchor the sealing valve 100 to recess 222$^b$ in container wall 290, and proximally from anchoring membrane 170 and configured to anchor the sealing valve 100 to recess 222$^a$ in the container cover 210.

Figure 17:
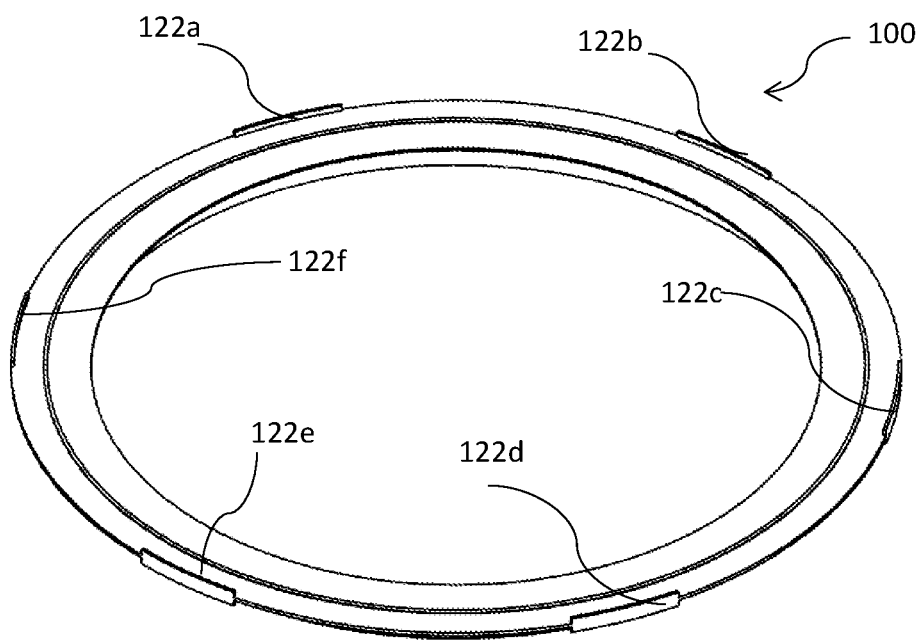
FIG. 17 shows a perspective view of a sealing valve 100 with a plurality of seal flanges, in a peripheral free state, according to some implementations.

According to some embodiments, sealing valve 100 comprises a plurality of seal flanges 122. According to some embodiments, sealing valve 100 comprises a plurality of seal flanges 122, each extending from anchoring membrane 170. According to some embodiments, anchoring membrane 170 is connected to each of plurality of seal flanges 122, which are extending therefrom. According to some embodiments, each one of plurality of seal flanges 122 is extending longitudinally from anchoring membrane 170 distally and/or proximally. According to some embodiments, container cover 210 comprises cover a plurality of cover recesses 222$^a$. According to some embodiments, container wall 290 comprises a plurality of wall recess 222$^b$. Sealing valve 100 having a plurality of seal flanges 122 is shown in FIG. 17.

According to some embodiments, anchoring membrane 170 comprises a plurality of seal flanges 122, each configured to anchor sealing valve 100 to one of plurality of recesses 222$^b$ in container wall 290, to one of plurality of recesses 222$^a$ in container cover 210, or both.

According to some embodiments, sealing valve 100 comprises a plurality of seal flanges 122, each extending distally from anchoring membrane 170 and configured to anchor sealing valve 100 to one of plurality of recesses 222$^b$, wherein each of plurality of seal flanges 122 is further extending proximally from anchoring membrane 170 and configured to anchor sealing valve 100 to one of plurality of recesses 222$^a$ in the container cover 210.

According to some embodiments, the container of container-sealing assembly 200 comprises a container brim 296. According to some embodiments, container brim 296 is positioned at the proximal end of container wall 290. According to some embodiments, container brim 296 is connected to the proximal end of container wall 290. According to some embodiments, container brim 296 is extending radially outward away from the proximal end of container wall 290. Specifically, container brim 296 is pointed out in FIGS. 3A and 3B surrounding the container.

It is to be understood the wall recess(s) 222$^b$ may be located within the proximal end of container wall 290 (as shown, e.g. in FIG. 4B), within container brim 296 (as shown, e.g. in FIG. 3A) or partially within each (as shown, e.g. in FIG. 3C). thus, whenever 222$^b$ is described as located at the proximal end of container wall 290 it is understood that it may also located at container brim 296. According to some embodiments, wall recess(s) 222$^b$ is located at the proximal end of container wall 290. According to some embodiments, wall recess(s) 222$^b$ is located at container brim 296.

Anchoring membrane 170 also comprises anchoring membrane lip 176, according to some embodiments. According to some embodiments, anchoring membrane lip 176 is positioned an external end of anchoring membrane 170. Specifically, according to some embodiments, anchoring membrane 170 has an external end facing container external environment 10 and an internal end connected to membrane juncture 154. Anchoring membrane lip 176 is also defining the external end of sealing valve 100, according to some embodiments. Anchoring membrane lip 176 may be located inside the container (as shown, e.g. in FIG. 3A), at the edge of the container (e.g. FIGS. 3B-D) or out of the container (e.g. in FIG. 11).

Figure 4A:
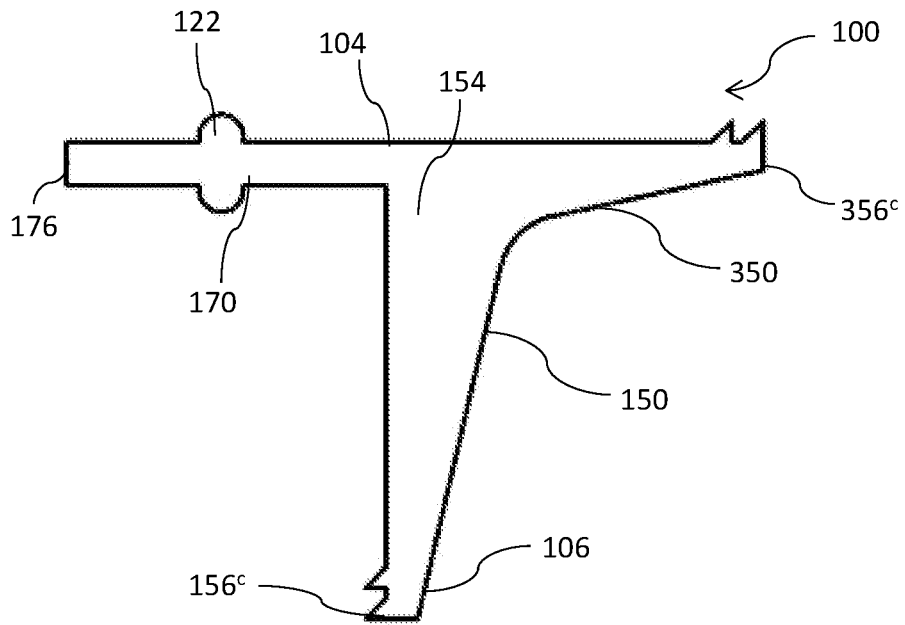
FIG. 4A shows a cross-sectional view of a sealing valve 100 provided with teeth-shaped membrane lips, according to some implementations.
Figure 4B:
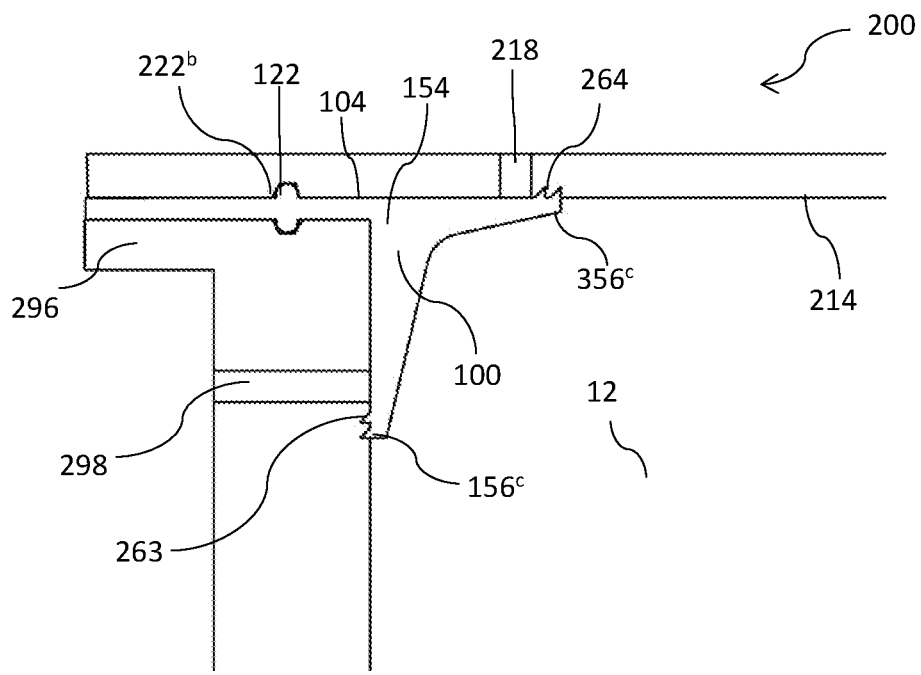
FIGS. 4B-4C show cross-sectional views of a container sealing assembly 200 that includes the sealing valve of FIG. 4A mounted between a container wall and a container cover, when fluid flow is applied through a cover opening (FIG. 4B) and when fluid flows are applied through both a cover opening and a wall opening (FIG. 4C) according to some implementations.
Figure 4C:
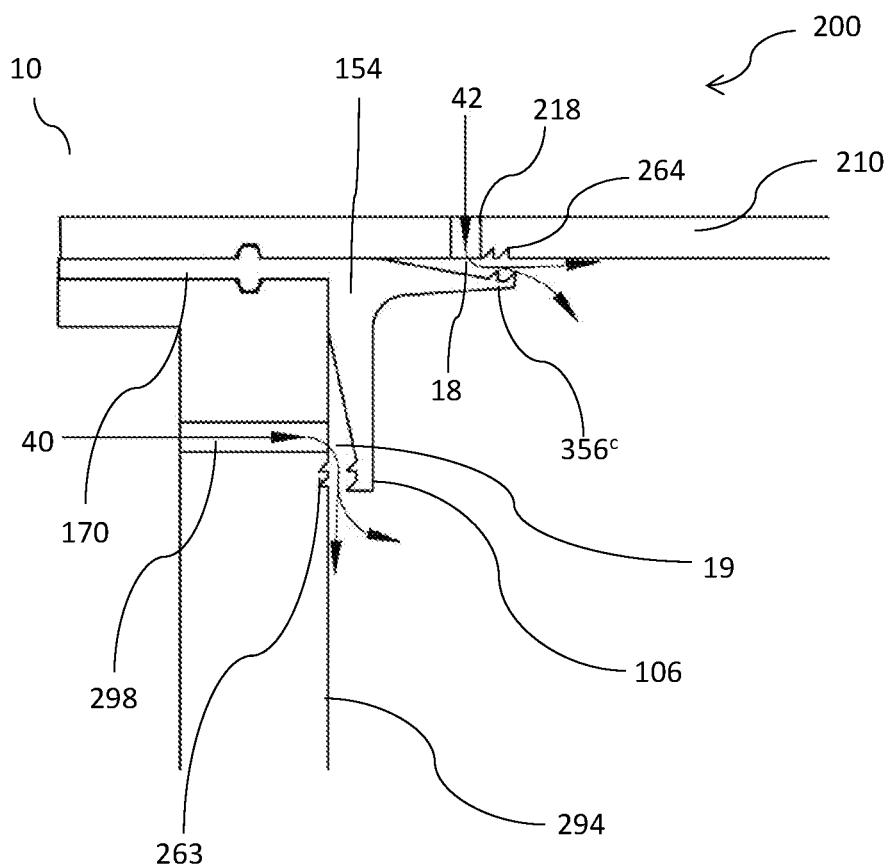

Reference is now made to FIGS. 4A-C. FIG. 4A shows a perspective view of a sealing valve 100 in a peripheral free state, according to some implementations. FIGS. 4B-4C shows cross-sectional views of a container-sealing assembly 200 with a container and sealing valve 100, as shown in FIG. 4A, according to some implementations.

Sealing valve 100 and container-sealing assembly 200 of FIGS. 4A-C are similar to those of sealing valve 100 and container-sealing assembly 200 of FIGS. 1-3 and share many common features as can be appreciated by the skilled in the art. According to some embodiments, sealing valve 100 and container-sealing assembly 200 of FIGS. 4A-C are more specific embodiments, of the corresponding products which are presented generally above. Specific features or components are described below.

Thus, FIGS. 4A-C are showing exemplary alternative implementations of some components of sealing valve 100 and container-sealing assembly 200.

As specified above, according to some embodiments, first membrane lip 156 may be a serrated membrane lip 156$^c$. similarly, according to some embodiments, second membrane lip 356 may be a serrated membrane lip 356. Such membrane lip may be beneficial for sealing, in some implementations of sealing valve 100.

When serrated membrane lips are applied, is it preferable to have corresponding receiving channel in the receiving wall, adapted to accommodate said lips, according to some embodiments. According to some embodiments, container wall 290 comprises a first membrane receiving channel 263$^c$, dimensioned to receive and accommodate serrated membrane lip 156$^c$.

According to some embodiments, upon sealing of first membrane 150 against container wall 290 serrated first membrane lip 156$^c$ is accommodated within first membrane receiving channel 263$^c$. According to some embodiments, upon sealing of first membrane 150 against interior wall surface 294 serrated first membrane lip 156$^c$ is accommodated within first membrane receiving channel 263$^c$. According to some embodiments, upon sealing of first membrane 150 against at least one wall opening 298 serrated first membrane lip 156$^c$ is accommodated within first membrane receiving channel 263$^c$. According to some embodiments, upon bending of serrated first membrane lip 156$^c$ inward, it is not accommodated within first membrane receiving channel 263$^c$.

According to some embodiments, container cover 210 comprises a second membrane receiving channel 264, dimensioned to receive and accommodate serrated second membrane lip 356$^c$.

According to some embodiments, upon sealing of second membrane 350 against container cover 210 serrated second membrane lip 356$^c$ is accommodated within second membrane receiving channel 264. According to some embodiments, upon sealing of second membrane 350 against distal cover surface 214 serrated second membrane lip 356$^c$ is accommodated within second membrane receiving channel 264. According to some embodiments, upon sealing of second membrane 350 against at least one cover opening 218 serrated second membrane lip 356$^c$ is accommodated within second membrane receiving channel 264. According to some embodiments, upon bending of serrated second membrane lip 356$^c$ distally, it is not accommodated within second membrane receiving channel 264$^c$.

According to some embodiments, upon transition from the first sealing state to the first bent state first membrane lip 156$^c$ is displaced inwards towards longitudinal centerline 70, such that it is out of first membrane receiving channel 263$^c$. According to some embodiments, upon transition from the first bent state to the first sealing state first membrane lip $156^c$ is displaced outwards, such that it accommodated within first membrane receiving channel $263^c$.

According to some embodiments, upon transition from the second sealing state to the second bent state second membrane lip $356^c$ is displaced distally, such that it is out of second membrane receiving channel $264^c$. According to some embodiments, upon transition from the second bent state to the second sealing state second membrane lip $356^c$ is displaced proximally, such that it accommodated within second membrane receiving channel $264^c$.

According to some embodiments, when sealing valve 100 is assembled between container wall 290 and container cover 210, first membrane 150 is flush with container wall 290 along the longitudinal plane, first membrane lip $156^c$ is accommodated within first membrane receiving channel $263^c$ and second membrane lip $356^c$ is accommodated within second membrane receiving channel 264.

As also detailed above, wall recess(es) $222^b$ may be located entirely within the proximal end of container wall 290 as shown in FIGS. 4B and 4C. According to some embodiments, as further detailed above, anchoring membrane 170 may also comprise a seal flange 122, configured to anchor the sealing valve 100 to recess $222^b$ in container wall 290.

FIG. 4B represent a state, wherein none of flow path against second membrane 42 and path against first membrane 40 is applied against any of first membrane 150 and second membrane 350. The effect on sealing valve 100 is elaborated above, when discussing FIGS. 1, 2 and 3A.

FIG. 4C represent a state, wherein flow path against second membrane 42 is applied in the distal direction through at least one cover opening 218 and the flow path against first membrane 40 is applied in the inward direction through at least one wall opening 298. The effect on sealing valve 100 is elaborated above, when discussing FIGS. 3B-D.

Figure 5A:
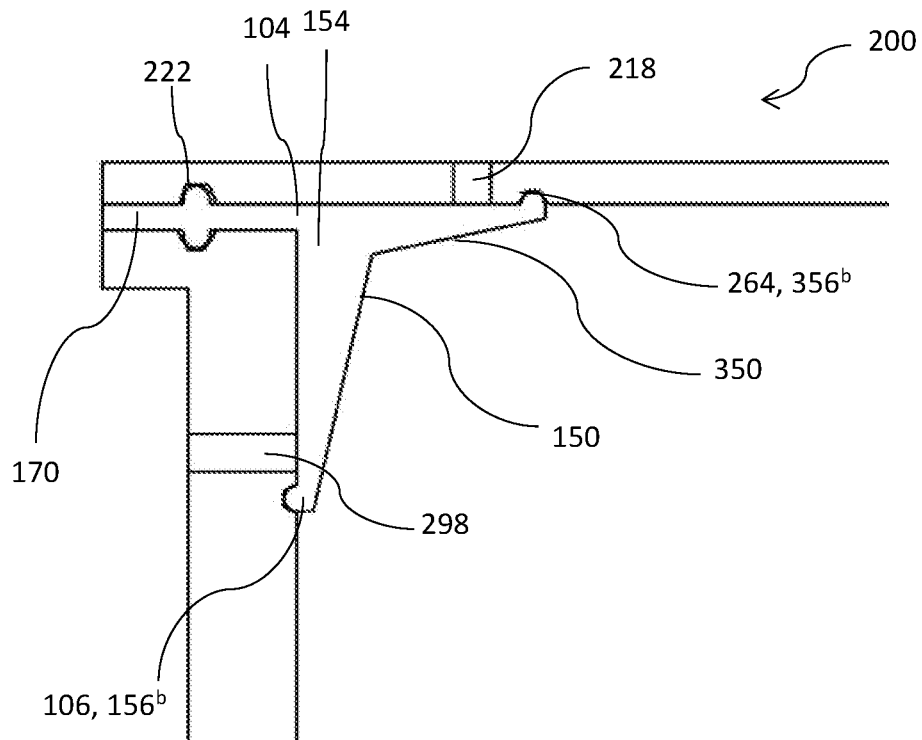
FIG. 5A shows a cross-sectional view of a container sealing assembly 200 that includes a sealing valve 100 provided with round-shaped membrane lips, mounted between a container wall and a container cover, each provided with membrane receiving channels, according to some implementations.
Figure 5B:
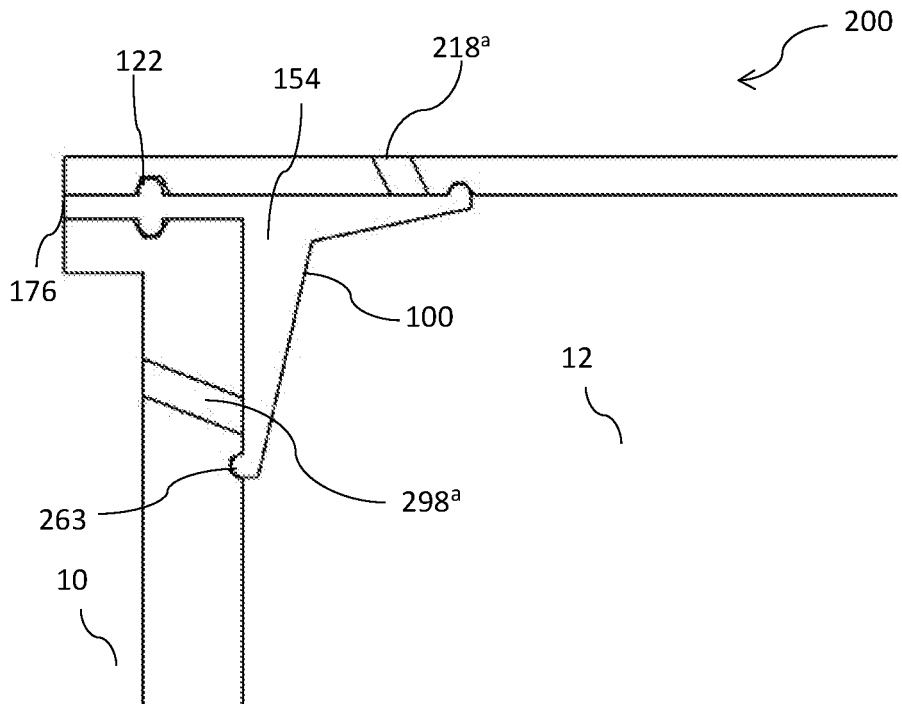
FIGS. 5B-5C show cross-sectional views of a container sealing assembly 200 that includes the sealing valve of FIG. 5A, mounted between a container wall and a container cover, each provided with membrane receiving channels and inclined openings, when fluid flow is not applied (FIG. 5B), and when fluid flows are applied through both the cover inclined opening and the wall inclined opening (FIG. 5C), according to some implementations.
Figure 5C:
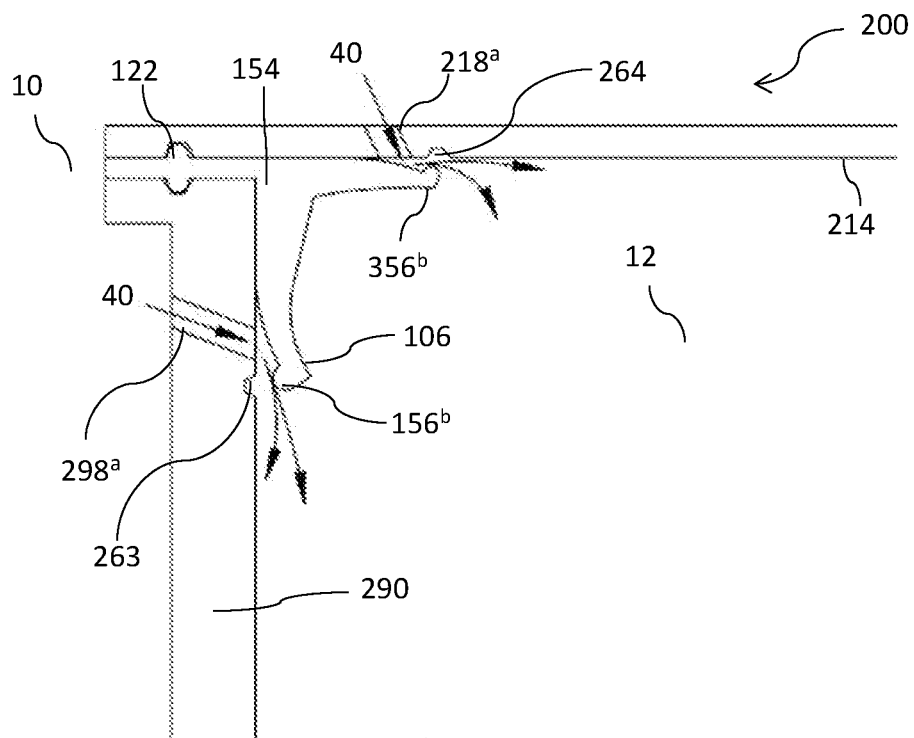

Reference is now made to FIGS. 5A-C. FIG. 5A shows a cross-sectional view of container-sealing assembly 200 with a container and sealing valve 100. FIGS. 5B-5C shows cross-sectional views of a container-sealing assembly 200 with a container the sealing valve 100 of FIG. 5A, according to some implementations.

Sealing valve 100 and container-sealing assembly 200 of FIGS. 5A-C are similar to those of sealing valve 100 and container-sealing assembly 200 of FIG. 4A-C and share many common features as can be appreciated by the skilled in the art. Specific features or components are described below.

Thus, FIGS. 5A-C are showing exemplary alternative implementations of some components of sealing valve 100 and container-sealing assembly 200.

Specifically, the container of FIG. 5A is similar to that in FIGS. 2, 3A-D and 4A-C, while sealing valve 100 of FIG. 5A has specific features, which are specific embodiments not shown in FIGS. 2-4. Sealing valve 100 of FIGS. 5B and 5C is similar to that described in FIG. 5A, whereas the container of FIGS. 5A-B has a feature not presented in the containers as presented in FIGS. 2-4 and 5A.

Specifically, container cover 210 of the container presented in FIGS. 5B and 5C has at least one inclined cover opening $218^a$. Similarly, container wall 290 of the container presented in FIGS. 5B and 5C has at least one inclined wall opening $298^a$.

According to some embodiments, container cover 210 has at least one inclined cover opening $218^a$. According to some embodiments, container cover 210 has one inclined cover opening $218^a$. According to some embodiments, container cover 210 has a plurality of inclined cover openings $218^a$. According to some embodiments, container wall 290 has at least one inclined wall opening $298^a$. According to some embodiments, container wall 290 has one inclined wall opening $298^a$. According to some embodiments, container wall 290 has a plurality of inclined wall openings $298^a$.

Specifically, at least one cover opening 218 and at least one wall opening 298 are designed to allow flow of fluids from out of the container to internal vessel cavity 12, according to some embodiments. As detailed above, such fluid may be cleaning compositions, such as detergents, for cleaning e.g. internal vessel cavity 12, interior wall surface 294, distal cover surface 214, an inner (proximal) surface of container floor 291 and the components of sealing valve 100.

Inclined openings, such as at least one inclined wall opening 298 and at least one inclined cover opening 218 may affect the flow path against first membrane 40, flow path against second membrane 42 and, as a result may have an effect on cover passage 18 and wall passage 19. Such effects may contribute in designing the cleaning procedure.

Although the Figures are presenting the same type of opening inclination (i.e. at least one inclined cover opening $218^a$ together with at least one inclined wall opening $298^a$, and at least one straight cover opening 218 together with at least one straight wall opening 298), it is to be understood that combinations of inclination type as also contemplated. For example, a container-sealing assembly 200 having a plurality of cover opening 218, some of which are inclined, while some of which are straight is contemplating. Also, For example, a container-sealing assembly 200 having one straight opening 218 and a plurality of inclined wall openings $298^a$ is contemplated.

FIGS. 5A-C are further presenting second rounded membrane lip $356^b$ and first rounded membrane lip $156^b$. such lips function similarly as described with respected to second serrated membrane lip $356^c$ and first serrated membrane lip $156^c$, as elaborated above.

As specified above, according to some embodiments, first membrane lip 156 may be a rounded membrane lip $156^b$. Similarly, according to some embodiments, second membrane lip 356 may be a rounded membrane lip $356^b$. Such membrane lip may be beneficial for sealing, in some implementations of sealing valve 100.

As with second serrated membrane lip $356^c$ and first serrated membrane lip $156^c$, when rounded membrane lips $356^b$ and/or $156^b$ are applied, is it preferable to have corresponding receiving channel in the receiving wall and/or cover, adapted to accommodate said lips, according to some embodiments.

According to some embodiments, container wall 290 comprises a first membrane receiving channel $263^b$, dimensioned to receive and accommodate rounded membrane lip $156^b$. According to some embodiments, upon sealing of first membrane 150 against container wall 290 rounded first membrane lip $156^b$ is accommodated within first membrane receiving channel $263^c$.

According to some embodiments, container cover 210 comprises a second membrane receiving channel $264^b$, dimensioned to receive and accommodate rounded second membrane lip $356^b$. According to some embodiments, upon sealing of second membrane 350 against container cover 210 rounded second membrane lip $356^b$ is accommodated within second membrane receiving channel $264^b$.

Other interactions between rounded first membrane lip $156^b$ and first membrane receiving channel $263^b$ and between rounded second membrane lip $356^b$ and second membrane receiving channel $264^b$ are substantially the same as described for the corresponding serrated elements 156$^b$, 356$^b$, 264$^b$ and 263$^b$, which are elaborated when discussing FIGS. 4A-C.

FIGS. 5A and 5B represent a state, wherein none of flow path against second membrane 42 and path against first membrane 40 is applied against any of first membrane 150 and second membrane 350. The effect on sealing valve 100 is elaborated above, when discussing FIGS. 1, 2 and 3A.

FIG. 5C represent a state, wherein flow path against second membrane 42 is applied in the distal direction through at least one cover opening 218 and the flow path against first membrane 40 is applied in the inward direction through at least one wall opening 298. The effect on sealing valve 100 is elaborated above, when discussing FIG. 3D.

Figure 6:
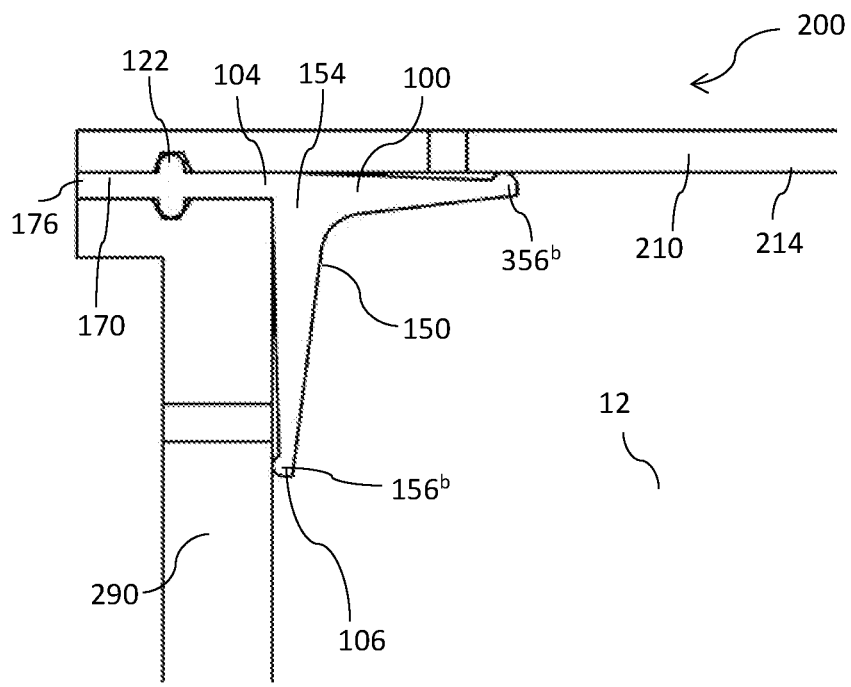
FIG. 6 shows cross-sectional views of a container sealing assembly 200 that includes a sealing valve 100 provided with round-shaped membrane lips, mounted between a container wall and a container cover, according to some implementations.

Reference is now made to FIG. 6. FIG. 6 shows a cross-sectional view of container-sealing assembly 200 with a container and sealing valve 100.

Sealing valve 100 and container-sealing assembly 200 of FIG. 6 is similar to those of sealing valve 100 and container-sealing assembly 200 of FIG. 5A and share many common features as can be appreciated by the skilled in the art. Specific features or components are described below.

Thus, FIG. 6 is showing exemplary alternative implementations of some components of sealing valve 100 and container-sealing assembly 200.

Specifically, sealing valve 100 of FIG. 6 is similar to that in FIG. 5A, while the container of FIG. 6 is similar to those presented in FIGS. 3A-D. In particular, sealing valve 100 of FIG. 6 has first rounded membrane lip 156$^b$ and rounded second membrane lip 356$^b$, as shown in sealing valve 100 of FIGS. 5A-C, whereas container wall 290 and container cover 210 of FIG. 6 does not include second membrane receiving channel 264$^b$ and first membrane receiving channel 263$^b$, for accommodating said lips, which is in contrast with the embodiment presented in FIGS. 5A-C. This is to show that sealing valves 100, which include rounded membrane lip(s) 156$^b$ and/or 356$^b$ may be used for sealing containers, which do not have specific corresponding receiving channels 263$^b$ and/or 264$^b$, and still provide sufficient sealing, according to some embodiments.

According to some embodiments, although in the configuration of FIG. 6, first membrane 150 is not flush with interior wall surface 294, first membrane 150 is sealing against interior wall surface 294. According to some embodiments, when first membrane 150 is sealing against container wall 290, it is not flush with container wall 290.

Similarly, although in the configuration of FIG. 6, second membrane 350 is not flush with distal cover surface 214, first membrane 150 is sealing against distal cover surface 214. According to some embodiments, when second membrane 350 is sealing against container cover 210, it is not flush with container cover 210.

Although a configuration with rounded membrane lip(s) 156$^b$ and/or 356$^b$ is presented in FIG. 6, the present invention is not limited to such configuration. Containers lacking first membrane receiving channel 263 and/or second membrane receiving channel 264 may be employed with any type of membrane lip(s), including flat, serrated, rounded and/or square.

Figure 7:
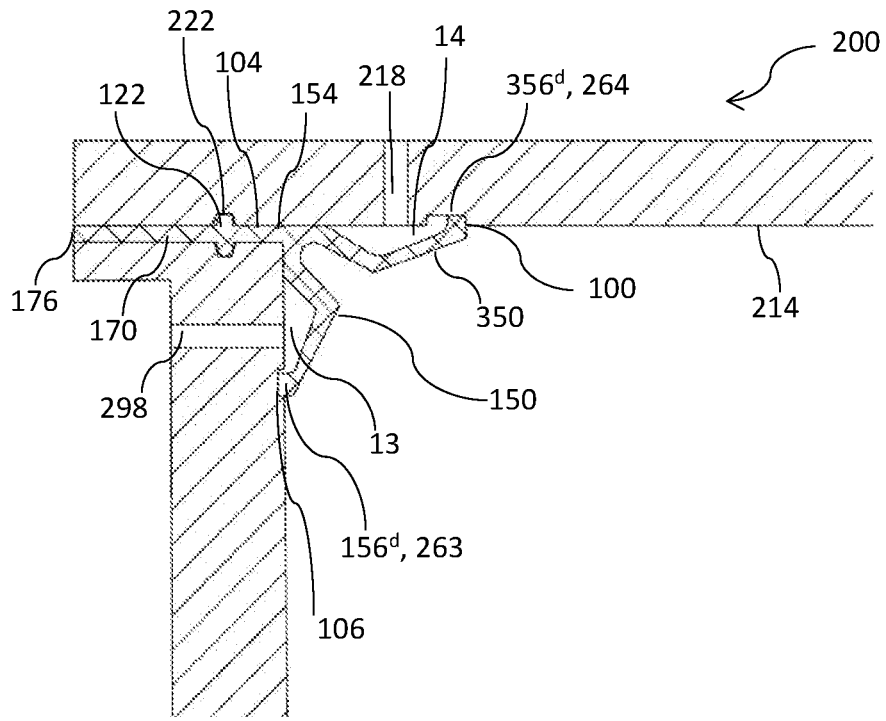
FIG. 7 shows a cross-sectional view of a container sealing assembly 200 that includes a sealing valve 100 provided with angled membrane bodies and square-shaped membrane lips, mounted between a container wall and a container cover, each provided with membrane receiving channels, according to some implementations.

Reference is now made to FIG. 7. FIG. 7 shows a perspective view of a sealing valve 100 in a peripheral free state, according to some implementations.

Sealing valve 100 and container-sealing assembly 200 of FIG. 7 are similar to those of sealing valve 100 and container-sealing assembly 200 of FIGS. 4-5 and share many common features as can be appreciated by the skilled in the art. According to some embodiments, sealing valve 100 and container-sealing assembly 200 of FIG. 7 are more specific embodiments, of the corresponding products which are presented generally or specifically above. Specific features or components are described below.

Thus, FIG. 7 is showing exemplary alternative implementations of some components of sealing valve 100 and container-sealing assembly 200.

As specified above, according to some embodiments, first membrane lip 156 may be a square membrane lip 156$^d$. Similarly, according to some embodiments, second membrane lip 356 may be a square membrane lip 356$^d$. Such membrane lip may be beneficial for sealing, in some implementations of sealing valve 100.

As with second serrated membrane lip 356$^c$ and first serrated membrane lip 156$^c$, when square membrane lips 356$^d$ and/or 156$^d$ are applied, is it preferable to have corresponding receiving channel in the receiving wall and/or cover, adapted to accommodate said lips, according to some embodiments.

According to some embodiments, container wall 290 comprises a first membrane receiving channel 263$^d$, dimensioned to receive and accommodate square membrane lip 156$^d$ According to some embodiments, upon sealing of first membrane 150 against container wall 290 square first membrane lip 156$^d$ is accommodated within first membrane receiving channel 263$^d$.

According to some embodiments, container cover 210 comprises a second membrane receiving channel 264$^d$, dimensioned to receive and accommodate rounded second membrane lip 356$^d$ According to some embodiments, upon sealing of second membrane 350 against container cover 210 square second membrane lip 356$^d$ is accommodated within second membrane receiving channel 264$^d$.

Other interactions between square first membrane lip 156$^d$ and first membrane receiving channel 263$^d$ and between square second membrane lip 356$^d$ and second membrane receiving channel 264$^d$ are substantially the same as described for the corresponding serrated elements 156$^b$, 356$^b$, 264$^b$ and 263$^b$, which are elaborated when discussing FIGS. 4A-C.

FIG. 7 represent a state, wherein none of flow path against second membrane 42 and path against first membrane 40 is applied against any of first membrane 150 and second membrane 350. The effect on sealing valve 100 is elaborated above, when discussing FIGS. 1, 2 and 3A.

In addition to the above, FIG. 7 is presenting a sealing valve 100 having a V-shaped first membrane 150 and V-shaped second membrane 350. These configurations may be relevant for specific sealing purposes.

According to some embodiments, first membrane 150 has an arched or v-shaped cross section. According to some embodiments, first membrane 150 has a v-shaped cross section. According to some embodiments, each of membrane juncture 154 and first membrane lip 156 is contacting container wall 290, and a portion of first membrane 150 is not contacting container wall 290. According to some embodiments, the portion not contacting container wall 290 is positioned between membrane juncture 154 and first membrane lip 156.

According to some embodiments, each of membrane juncture 154 and first membrane lip 156 is contacting container wall 290, and a portion of first membrane 150 is not contacting container wall 290 in the first sealing state. According to some embodiments, the portion not contacting container wall 290 is positioned between membrane juncture 154 and first membrane lip 156 in the first sealing state.

As detailed above, according to some embodiments, first membrane 150 has a proximal end, a distal end and a midsection between the proximal and distal ends (not numbered), wherein the distal end is in proximity with distal end 106 and the proximal end is connected to membrane juncture 154. According to some embodiments, each of proximal end and distal end is contacting interior wall surface 294, and the midsection of first membrane 150 is not contacting interior wall surface 294. According to some embodiments, each of proximal end and distal end is contacting interior wall surface 294, and the midsection of first membrane 150 is not contacting interior wall surface 294 in the first sealing state.

According to some embodiments, second membrane 350 has an arched or v-shaped cross section. According to some embodiments, second membrane 350 has a v-shaped cross section. According to some embodiments, each of membrane juncture 154 and second membrane lip 356 is contacting container cover 210, and a portion of second membrane 350 is not contacting container cover 210. According to some embodiments, the portion not contacting container cover 210 is positioned between membrane juncture 154 and second membrane lip 156.

According to some embodiments, each of membrane juncture 154 and second membrane lip 356 is contacting container cover 210, and a portion of second membrane 350 is not contacting container cover 210 in the second sealing state. According to some embodiments, the portion not contacting container cover 210 is positioned between membrane juncture 154 and second membrane lip 356 in the second sealing state.

As detailed above, according to some embodiments, second membrane 350 has an external end, an internal end and a midsection between the internal and external ends (not numbered), wherein the internal end is facing longitudinal centerline 70 and the external end is connected to membrane juncture 154. According to some embodiments, each of the internal end and distal end is contacting distal cover surface 214, and the midsection of second membrane 350 is not contacting distal cover surface 214. According to some embodiments, each of the internal end and external end is contacting distal cover surface 214, and the midsection of second membrane 350 is not contacting distal cover surface 214 in the second sealing state.

As depicted in FIG. 7, when V-shaped first membrane 150 is used, a cavity 13 between container wall 290 and first membrane 150 is formed, which is maintained during the sealing state, since first membrane 150 is not flush with container wall 290. Similarly, when V-shaped second membrane 350 is used, a cavity 14 between container wall 290 and second membrane 350 formed, which is maintained during the sealing state, since second membrane 350 is not flush with container cover 210.

Figure 8:
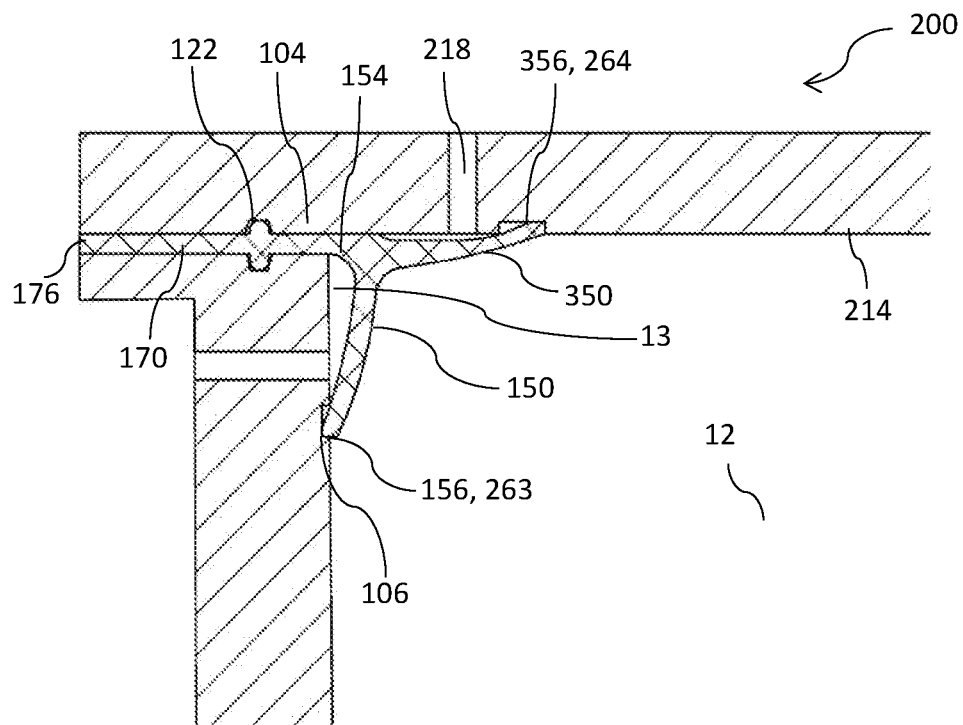
FIG. 8 shows a cross-sectional view of a container sealing assembly 200 that includes a sealing valve 100 provided with curved membrane bodies, mounted between a container wall and a container cover provided with membrane receiving channels, according to some implementations.

Reference is now made to FIG. 8. FIG. 8 shows a cross-sectional view of container-sealing assembly 200 with a container and sealing valve 100.

Sealing valve 100 and container-sealing assembly 200 of FIG. 8 is similar to sealing valve 100 and container-sealing assembly 200 of FIG. 7 and share many common features as can be appreciated by the skilled in the art. Specific features or components are described below.

Thus, FIG. 8 is showing exemplary alternative implementations of some components of sealing valve 100 and container-sealing assembly 200.

Specifically, the container 100 of FIG. 8 is similar to that in FIG. 7, while sealing valve 100 of FIG. 8 represents different embodiments of first membrane 150 and second membrane 350.

In particular, as detailed above, according to some embodiments, each one of first membrane 150 and second membrane 350 may, independently, have an arched or v-shaped cross section. According to some embodiments, each one of first membrane 150 and second membrane 350 may, independently, have an arched cross section.

First membrane 150 and second membrane 350 of FIG. 8 are arched membranes, and thus share common features with first membrane 150 and second membrane 350 of FIG. 7. The associations between each one of first membrane 150 and second membrane 350 of FIG. 8 and container elements (e.g. container cover 210, distal cover surface 214, second membrane receiving channel 264, container wall 290, interior wall surface 294 and first membrane receiving channel 263) are similar to those elaborated above with respect to FIG. 7.

As depicted in FIG. 8, when arched first membrane 150 is used a cavity 13 between container wall 290 and first membrane 150 is formed, which is maintained during the sealing state, since first membrane 150 is not flush with container wall 290. Similarly, when arched second membrane 350 is used, a cavity 14 between container wall 290 and second membrane 350 formed, which is maintained during the sealing state, since second membrane 350 is not flush with container cover 210.

Reference is now made to FIGS. 9 and 10. Each one of FIGS. 9 and 10, separately shows a cross-sectional view of container-sealing assembly 200 with a container and sealing valve 100.

Each one of sealing valves 100 and container-sealing assemblies 200 of FIGS. 9 and 10 is similar to sealing valve 100 and container-sealing assembly 200 of FIG. 5 and share many common features as can be appreciated by the skilled in the art. Specific features or components are described below.

Thus, FIGS. 9 and 10 are showing exemplary alternative implementations of some components of sealing valve 100 and container-sealing assembly 200.

Specifically, each one of sealing valve 100 of FIG. 9 and sealing valve 100 of FIG. 10 represents different embodiments of anchoring membrane 170. Similarly, each one of the container of FIG. 9 and the container of FIG. 10 represents different embodiments of container recess 222.

As can be seen anchoring membrane 170 of each one of sealing valve 100 of FIG. 9 and sealing valve 100 of FIG. 10 includes a protrusion and a corresponding receptacle recess in the container. More particularly, sealing valve 100 of FIG. 9 has an anchoring membrane 170, which includes anchoring membrane first protrusion 180, and sealing valve 100 of FIG. 10 has an anchoring membrane 170, which includes anchoring membrane first protrusion 180 and anchoring membrane second protrusion 178.

In particular, as detailed above, according to some embodiments, at least one seal flange 122 is protruding from the anchoring membrane 170 and extending around longitudinal centerline 70 along anchoring membrane 170. Thus, according to some embodiments, anchoring membrane 170 may include at least one protrusion. According to some embodiments, anchoring membrane first protrusion 180 is extending inside the proximal end of container cover 210. According to some embodiments, anchoring membrane second protrusion 178 is extending inside container cover 210.

According to some embodiments, anchoring membrane second protrusion 178 is accommodated within container recess 222. According to some embodiments, anchoring membrane first protrusion 180 is accommodated within container recess 222. According to some embodiments, container recess 222 is dimensioned to receive and accommodate anchoring membrane first protrusion 180. According to some embodiments, container recess 222 is dimensioned to receive and accommodate anchoring membrane second protrusion 178. According to some embodiments, container recess 222 is dimensioned to receive and accommodate anchoring membrane second protrusion 178 and anchoring membrane first protrusion 180.

Figure 11:
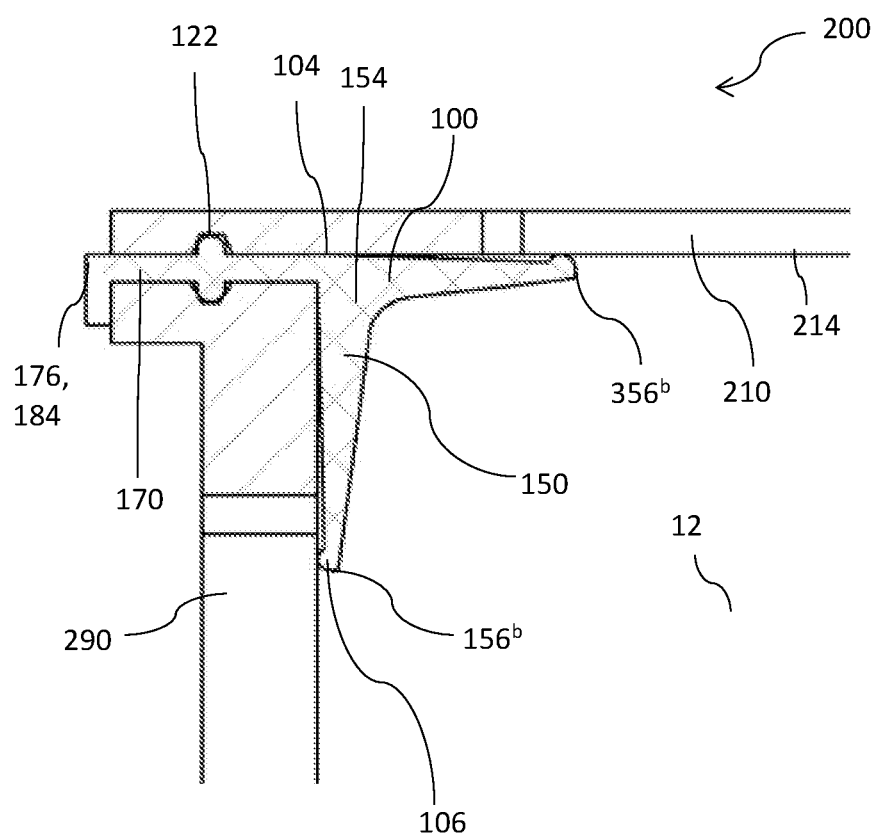
FIG. 11 shows a cross-sectional view of a container sealing assembly 200 that includes the sealing valve of FIG. 5A provided with an anchoring extension, mounted between a container wall and a container removable cover, according to some implementations.

Reference is now made to FIG. 11. FIG. 11 shows a cross-sectional view of container-sealing assembly 200 with a container and sealing valve 100.

Sealing valve 100 and container-sealing assembly 200 of FIG. 11 are similar to sealing valve 100 and container-sealing assembly 200 of FIG. 6 and share many common features as can be appreciated by the skilled in the art. Specific features or components are described below.

Thus, FIG. 11 is showing exemplary alternative implementations of some components of sealing valve 100 and container-sealing assembly 200. Specifically, sealing valve 100 of FIG. 11 represents different embodiments of anchoring membrane 170.

As can be seen anchoring membrane 170 of FIG. 11 has an anchoring membrane extension flange 184. According to some embodiments, anchoring membrane 170 has an anchoring membrane extension flange 184. According to some embodiments, anchoring membrane extension flange 184 is located at the external end of sealing valve 100. According to some embodiments, anchoring membrane extension flange 184 is located at the external end of sealing valve 100. According to some embodiments, anchoring membrane extension flange 184 is located at the external end of anchoring membrane 170. According to some embodiments, anchoring membrane extension flange 184 is located proximally to anchoring membrane lip 176.

According to some embodiments, anchoring membrane extension flange 184 is extending out of the container of container-sealing assembly 200. According to some embodiments, anchoring membrane extension flange 184 is substantially perpendicular to anchoring membrane 170.

According to some embodiments, anchoring membrane extension flange 184 is configured to anchor sealing valve 100 to the container of container-sealing assembly 200. It is to be understood that anchoring membrane extension flange 184 may be an alternative anchoring mechanism to the at least one seal flange 122—container recess 222 pair, or come in addition.

Figure 12A:
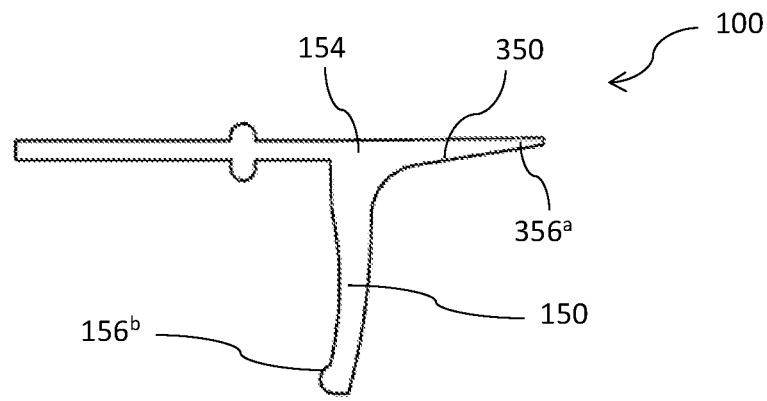
FIG. 12A shows a cross-sectional view of a sealing valve 100 provided with a first membrane with round-shaped membrane lip and second membrane with flat membrane lip, according to some implementations.
Figure 12B:
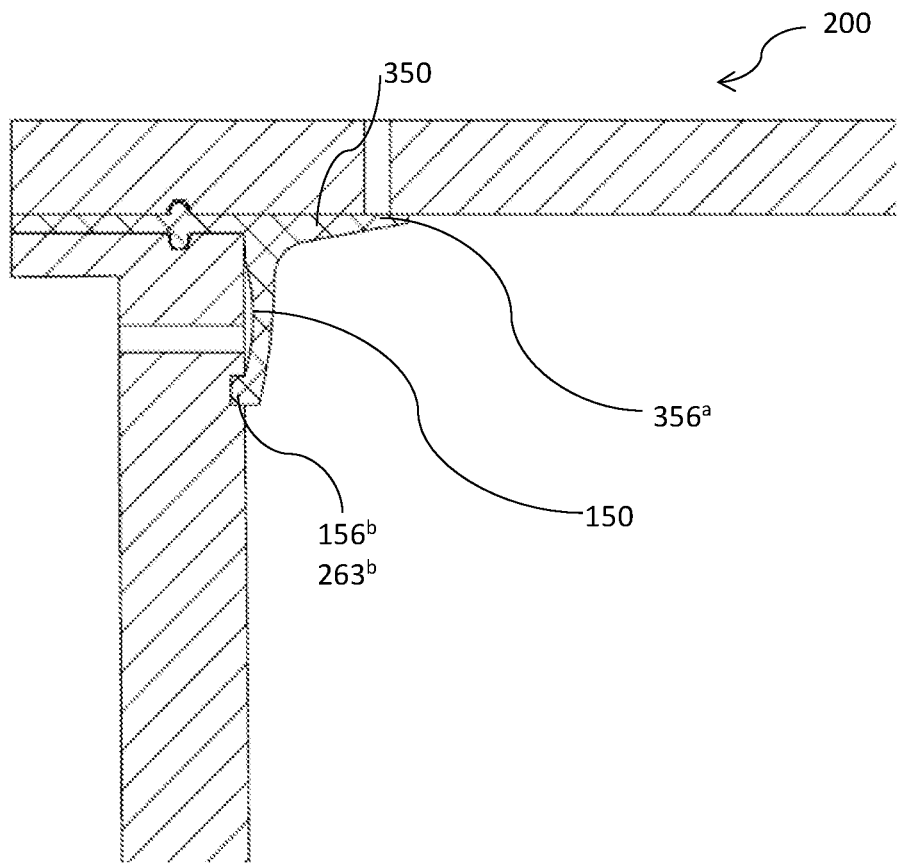
FIG. 12B shows a cross-sectional view of a container sealing assembly 200 that includes the sealing valve of FIG. 12A, mounted between a container wall and a container cover, wherein the wall has a receiving channel for the round-shaped membrane lip, according to some implementations.

Reference is now made to FIGS. 12A-B. FIG. 12A shows a cross-sectional view of a sealing valve 100. Sealing valve 100 of FIG. 12A comprises first membrane 150 comprising rounded first membrane lip $156^b$. Sealing valve 100 of FIG. 12A further comprises second membrane 350 comprising flat second membrane lip $356^a$. It is to be appreciated that for some implementations sealing valve 100 may be provided with different types of membranes, as shown in the present FIGS. 12A-B. In addition, sealing valve 100 of FIGS. 12A-B has an arched first membrane 150, whereas second membrane 350 of sealing valve 100 is straight.

FIG. 12B shows a cross-sectional view of a container sealing assembly 200 that includes sealing valve 100 of FIG. 12A, mounted in a container. As seen in FIG. 12B, container wall 290 wall has first membrane receiving channel $263^b$ configured to receive rounded first membrane lip $156^b$. Also, it can be seen that in FIG. 12B, first membrane 150 is arched, and only a portion thereof is contacting container wall 290, as detailed when discussing FIG. 8. Second membrane 350, on the other hand, is straight, and interacts with container cover 210 as detailed, e.g. when discussing FIGS. 3A-B.

Figure 13:
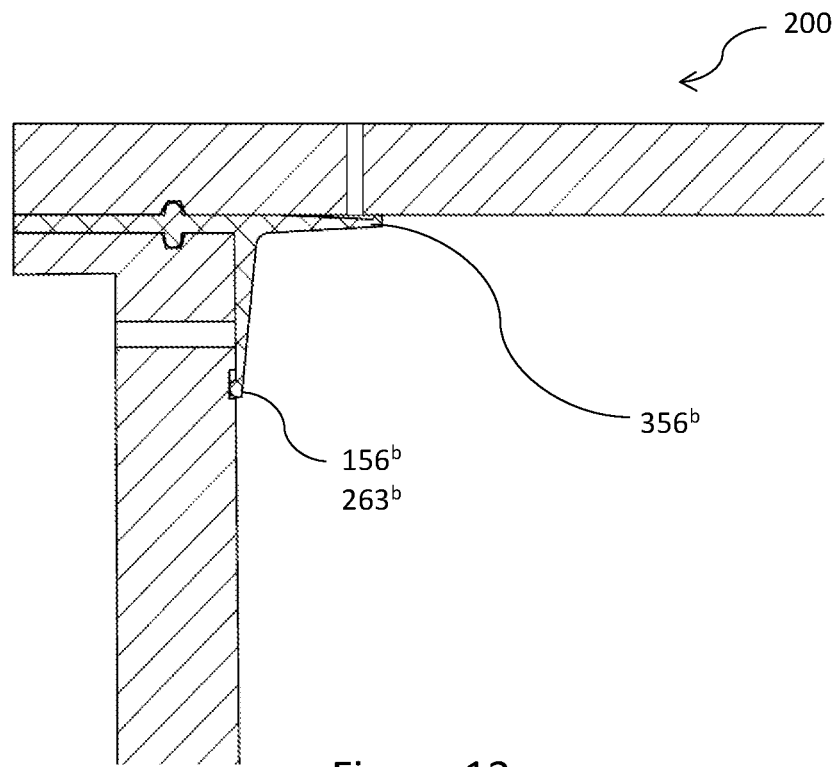
FIG. 13 shows a cross-sectional view of a container sealing assembly 200 that includes a sealing valve 100 provided with round-shaped membrane lips, the sealing valve is mounted between a container wall and a container cover, wherein the wall has a receiving channel for one of the round-shaped membrane lips, according to some implementations.

Reference is now made to FIG. 13. FIG. 13 is a cross-sectional view of a container sealing assembly 200 that includes a sealing valve 100. Sealing valve 100 of FIG. 13 is provided with both rounded first membrane lip $156^b$ in first membrane 150 and rounded second membrane lip $356^b$ in second membrane 350. This optional setup of sealing valve 100 is further elaborated when discussing FIGS. 5A-C and 6.

As seen in FIG. 13, container wall 290 has first membrane receiving channel $263^b$ configured to receive rounded first membrane lip $156^b$. A similar interaction between first membrane 150 with a rounded first membrane lip $156^b$ and a wall 290 with a first membrane receiving channel $263^b$ is elaborated when dealing with FIGS. 5A-C. Also, it can be seen that in FIG. 13, container cover 210 does not have a receiving channel. A similar interaction between second membrane 350 with a rounded first membrane lip $156^b$ and a container cover 210 without a receiving channel is elaborated when dealing with FIG. 6. It is to be appreciated that for some implementations sealing valve 100 may be provided with similar types of membranes, as shown in the present FIG. 13, whereas the interaction with container cover 210 and container wall 290 is different.

Figure 14:
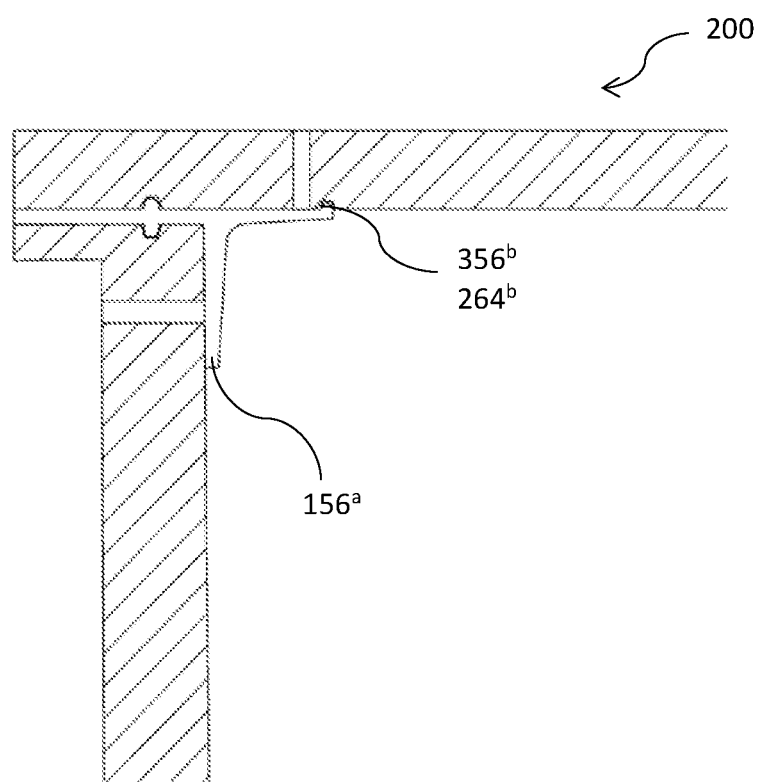
FIG. 14 shows a cross-sectional view of a container sealing assembly 200 that includes a sealing valve 100 provided with a second membrane with round-shaped membrane lip and a first membrane with flat membrane lip, the sealing valve is mounted between a container wall and a container cover, wherein the cover has a receiving channel for the round-shaped membrane lip, according to some implementations.

Reference is now made to FIG. 14. FIG. 14 is a cross-sectional view of a container sealing assembly 200 that includes a sealing valve 100. Sealing valve 100 of FIG. 14 comprises second membrane 350 comprising rounded second membrane lip $356^b$. Sealing valve 100 of FIG. 14 further comprises first membrane 150 comprising flat first membrane lip $156^a$. It is to be appreciated that for some implementations sealing valve 100 may be provided with different types of membranes, as shown in the present FIGS. 12A-B and 14.

As seen in FIG. 14, container cover 210 wall has second membrane receiving channel $264^b$ configured to receive second membrane lip $356^b$. Thus, the interaction between container wall 290, first membrane 150 and flat first membrane lip $156^a$ is as detailed, e.g. when discussing FIGS. 3A and 3C, and the interaction between container cover 210, second membrane 350, second membrane lip $356^b$ and second membrane receiving channel $264^b$ is as detailed, e.g. when discussing FIGS. 5A-C.

Figure 15A:
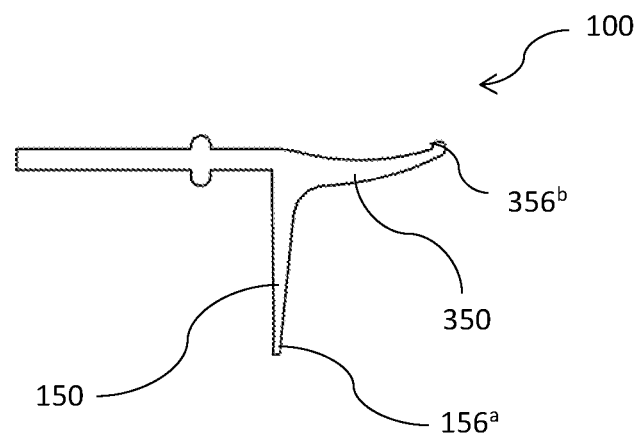
FIG. 15A cross-sectional view of a sealing valve 100 provided with an arched second membrane with round-shaped membrane lip and straight first membrane with flat membrane lip, according to some implementations.
Figure 15B:
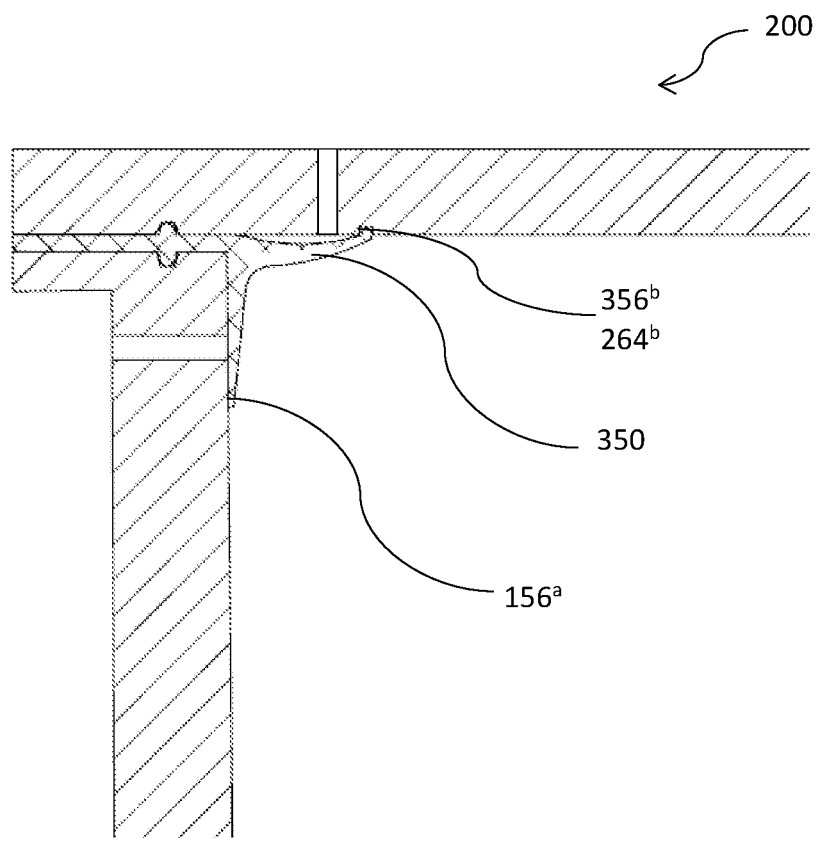
FIG. 15B shows a cross-sectional view of a container sealing assembly 200 that includes the sealing valve of FIG. 15A, mounted between a container wall and a container cover, wherein the cover has a receiving channel for the round-shaped membrane lip, according to some implementations.

Reference is now made to FIGS. 15A-B. FIG. 15A shows a cross-sectional view of a sealing valve 100. Sealing valve 100 of FIG. 15A comprises second membrane 350 comprising rounded second membrane lip $356^b$. Sealing valve 100 of FIG. 15A further comprises first membrane 150 comprising flat first membrane lip $156^a$. It is to be appreciated that for some implementations sealing valve 100 may be provided with different types of membranes, as shown in the present FIGS. 12A-B and 15A-B. In addition, sealing valve 100 of FIGS. 15A-B has an arched second membrane 350, whereas first membrane 150 of sealing valve 100 is straight.

FIG. 15B shows a cross-sectional view of a container sealing assembly 200 that includes sealing valve 100 of FIG. 15A, mounted in a container. As seen in FIG. 15B, container cover 210 wall has second membrane receiving channel $264^b$ configured to receive rounded second membrane lip $356^b$. Also, it can be seen that in FIG. 15B, second membrane 350 is arched, and only a portion thereof is contacting container cover 210, as detailed when discussing FIG. 8.

Second membrane 350, on the other hand, is straight, and interacts with container wall 290 as detailed, e.g. when discussing FIGS. 3A and 3C.

Figure 16:
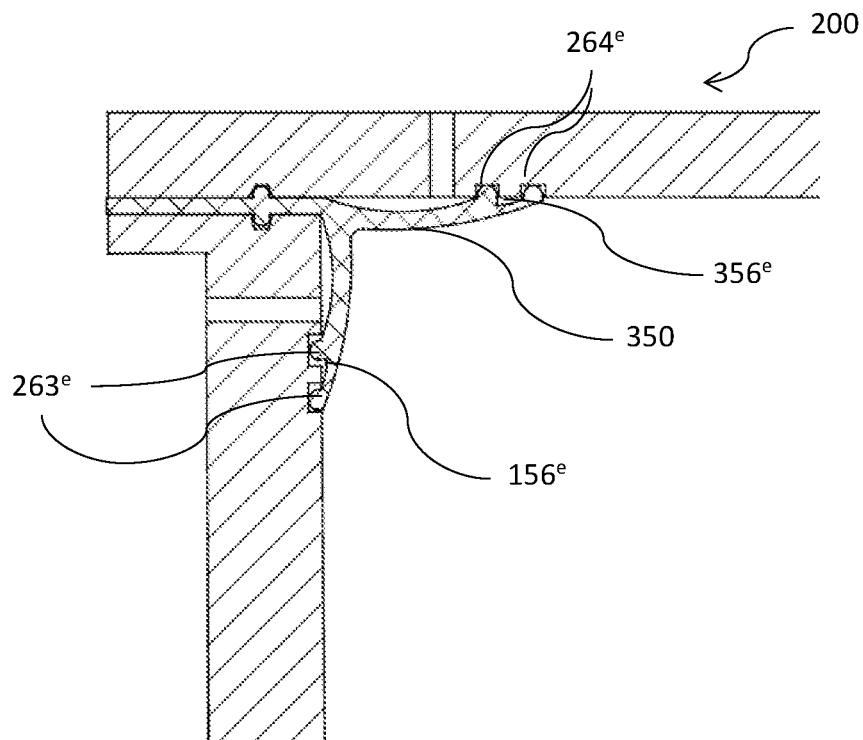
FIG. 16 shows a cross-sectional view of a container sealing assembly 200 that includes a sealing valve 100 provided with two-part membrane lips, mounted between a container wall and a container cover, each provided with membrane receiving channels, according to some implementations.

Reference is now made to FIG. 16. FIG. 16 is a cross-sectional view of a container sealing assembly 200 that includes a sealing valve 100 mounted between container cover 210 and container wall 290. Sealing valve 100 of FIG. 16 has a first membrane 150 comprising two-part first membrane lip 156$^e$. Sealing valve 100 of FIG. 16 further comprises a second membrane 350 comprising two-part second membrane lip 356$^e$. Accordingly, container cover 210 has two-part first membrane receiving channel 263$^e$ for receiving two-part first membrane lip 156$^e$ and container wall 290 has two-part second membrane receiving channel 264$^e$ for receiving two-part second membrane lip 356$^e$. the interactions between the membranes and container elements of sealing valve 100 of the present figure are similar to those described when discussing FIGS. 5A-C.

Figure 18:
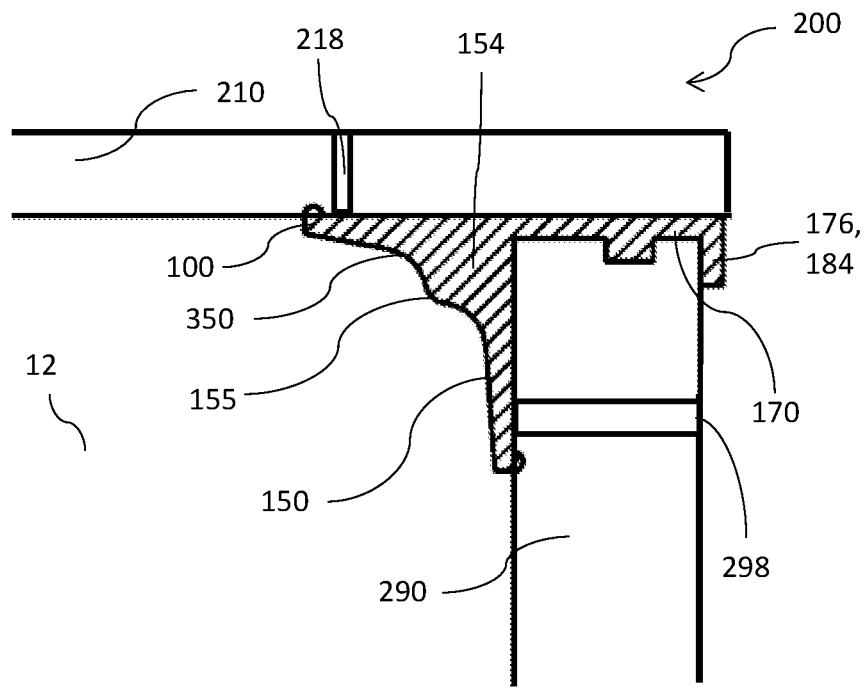
FIG. 18 shows a cross-sectional view of container-sealing assembly 200 with a container and sealing valve 100 provided with a curvature surface extending from the membrane juncture, according to some implementations.

Reference is now made to FIG. 18. FIG. 18 shows a cross-sectional view of container-sealing assembly 200 with a container and sealing valve 100, according to some implementations.

Sealing valve 100 and container-sealing assembly 200 of FIG. 18 are similar to sealing valve 100 and container-sealing assembly 200 of FIG. 5A, comprising the anchoring membrane lip 176 and anchoring membrane extension flange 184 of FIG. 11, and therefore share many common features as can be appreciated by the skilled in the art. Specific features or components are described below.

Thus, FIG. 18 is showing exemplary alternative implementations of some components of sealing valve 100 and container-sealing assembly 200. Specifically, sealing valve 100 of FIG. 18 represents different embodiments of membrane juncture 154.

According to some embodiments, sealing valve 100 comprises a curvature surface 155 extending from membrane juncture 154 between the first membrane 150 and the second membrane 350, in the direction of the internal vessel cavity 12 of the container. According to some embodiments, the curvature surface 155 is extending from the membrane juncture 154 radially around longitudinal centerline 70.

According to some embodiments, the curvature surface 155 is a rounded or a vaulted surface.

According to some embodiments, when sealing valve 100 is assembled between container wall 290 and container cover 210, first membrane 150 is flush with container wall 290 along the longitudinal plane, and second membrane 350 is flush with container cover 210 along the lateral plane. As detailed above, according to some embodiments, first membrane 150 is tapering radially distally, while second membrane 350 is tapering inward. According to some embodiments, first membrane 150 has a proximal and distal ends (not numbered), wherein the distal end is in proximity with distal end 106, and the proximal end is connected to the curvature surface 155 of the membrane juncture 154. According to further embodiments, second membrane 350 has an internal and external ends (not numbered), wherein the internal end is facing longitudinal centerline 70 and the external end is connected to the curvature surface 155 of the membrane juncture 154.

According to some embodiments, the proximal end the of the first membrane 150 is connected to the curvature surface 155 and is wider than the distal end thereof, while the external end of the second membrane 350 is connected to the curvature surface 155 and is wider than the internal end thereof, thus forming a double curved surface at the membrane juncture 154 (i.e., curvature surface 155) between the first membrane 150 and the second membrane 350. According to some embodiments, first membrane 150 is tapering radially distally, while second membrane 350 is tapering inward, thus forming a double curved surface at the membrane juncture 154 (i.e., curvature surface 155) located therebetween.

According to some embodiments, the curvature surface 155 is a double curved surface, comprising two curves: one extending between the distal end of first membrane 150 towards the proximal end thereof connected to the membrane juncture 154, while the other is extending between the internal end of the second membrane 350 towards the external end connected to the membrane juncture 154.

Without wishing to be bound by any theory or mechanism of action, it is suggested that the curvature surface 155 of the membrane juncture 154 can enhance the ability of the first membrane 150 to make the spontaneous transition from its bent configuration outward back toward container wall 290 (i.e. from the first bent state to the first sealed state) when the flow-induced pressure gradient is no longer applied thereto. Furthermore, it is suggested that the curvature surface 155 of the membrane juncture 154 can enhance the ability of the second membrane 350 to transition from its bent configuration proximally back toward container cover 210 (i.e. from the second bent state to the second sealed state) when the flow-induced pressure gradient is no longer applied thereto. Advantageously, it is suggested that the double curved structure of the curvature surface 155 can enhance the ability of the resilient flexible first and second membranes, 150 and 350, respectively, to transition from the bent states to the sealed states (i.e., from the first and second bent states to the first and second sealing states, as disclosed above), when the flow-induced pressure gradient is no longer applied thereto.

Figure 19:
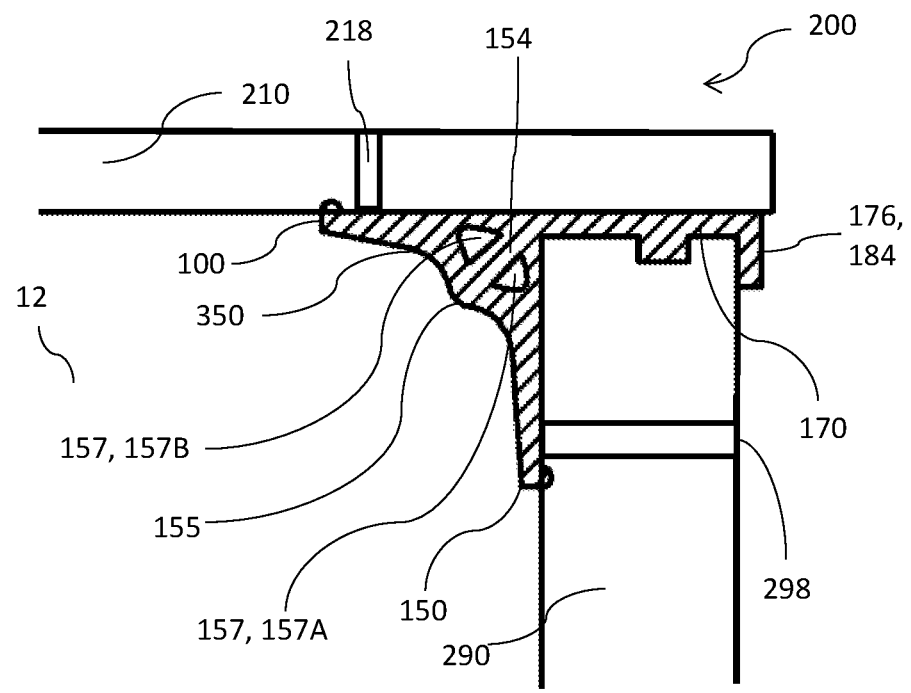
FIG. 19 shows a cross-sectional view of container-sealing assembly 200 with a container and sealing valve 100 provided with at least one inner channel disposed within the membrane juncture, according to some implementations.

Reference is now made to FIG. 19. FIG. 19 shows a cross-sectional view of container-sealing assembly 200 with a container and sealing valve 100, according to some implementations.

Sealing valve 100 and container-sealing assembly 200 of FIG. 19 are similar to sealing valve 100 and container-sealing assembly 200 of FIG. 18 and share many common features as can be appreciated by the skilled in the art. Specific features or components are described below.

Thus, FIG. 19 is showing exemplary alternative implementations of some components of sealing valve 100 and container-sealing assembly 200. Specifically, sealing valve 100 of FIG. 19 represents different embodiments of membrane juncture 154 comprising the curvature surface 155 extending therefrom.

According to some embodiments, the membrane juncture 154 comprises at least one inner channel 157 disposed therewithin and extending at least partially along the membrane juncture 154. According to some embodiments, the membrane juncture 154 comprises at least one inner channel 157 disposed therewithin and extending radially along the entire length of the membrane juncture 154 of sealing valve 100.

According to some embodiments, the at least one inner channel 157 comprises an elastic material disposed therein (not shown), wherein said elastic material is different from the elastomeric material the sealing valve 100 is made of. The elastic material can comprise a spring, according to some embodiments. According to some embodiments, the elastic material disposed within the at least one inner channel 157 is configured to be compressed without being permanently deformed (e.g., without experiencing plastic deformation) when the above-mentioned flow-induced pressure gradient is applied on the first and second membranes, 150 and 350, respectively. According to further embodiments, the elastic material disposed within the at least one inner channel 157 is further configured to return to its original resilient shape when the flow-induced pressure gradient is no longer applied on the first and second membranes, 150 and 350, respectively. Without wishing to be bound by any theory or mechanism of action, it is suggested that the elastic material disposed within the at least one inner channel 157 can enhance the ability of the resilient flexible first and second membranes, 150 and 350, respectively, to transition from the bent states to the sealed states, when the flow-induced pressure gradient is no longer applied thereto.

According to some alternative embodiments, the at least one inner channel 157 is hollow, as can be seen at FIG. 19.

According to some embodiments, the membrane juncture 154 comprises a plurality of inner channels 157. According to some embodiments, each one of the plurality of inner channels 157 is hollow. According to some embodiments, the membrane juncture 154 comprises a first inner channel 157A and a second inner channel 157B, as can be seen at FIG. 19.

As used herein, the term "plurality" refers to an integer higher than one.

According to some embodiments, sealing valve 100 comprises the curvature surface 155 extending from membrane juncture 154 between the first membrane 150 and the second membrane 350, in the direction of the internal vessel cavity 12 of the container, radially around longitudinal centerline 70, as disclosed above. Without wishing to be bound by any theory or mechanism of action, it is suggested that the vaulted structure of the curvature surface 155 can increase the dimensions (e.g., shape) of the membrane juncture 154, and thus enable it to comprise a plurality of inner channels 157 (e.g., first inner channel 157A and second inner channel 157B) therein.

According to some embodiments, the plurality of hollow inner channels 157 disposed within the membrane juncture 154 of sealing valve 100 can affect (or change) the resilient flexibility and/or elastic properties of the sealing valve 100, and specifically those of the first membrane 150 and the second membrane 350. According to further embodiments, the plurality of hollow inner channels 157 disposed within the membrane juncture 154 of sealing valve 100 are configured to reduce the elastic properties of the first membrane 150 and the second membrane 350. Without wishing to be bound by any theory or mechanism of action, it is suggested that the plurality of hollow inner channels 157 disposed within the membrane juncture 154 of sealing valve 100 can reduce the ability of the resilient flexible first and second membranes, 150 and 350, respectively, to transition from the bent states to the sealed states, when the flow-induced pressure gradient is no longer applied thereto, thus reducing the sealing capabilities of the sealing valve 100.

As was disclosed above, according to some embodiments, the first membrane 150 is configured to seal wall opening(s) 298, and the second membrane 350 is configured to seal cover opening(s) 218. According to further embodiments, in order to allow flow of cleaning fluids into internal vessel cavity 12, each one of first membrane 150 and second membrane 350 is configured to bend away from the opening(s) it seals, when flow-induced pressure gradient is applied thereto by fluid flowing in the direction opposite from said opening(s). However, if the flow-induced pressure gradient through the opening(s) is low (e.g., caused by a low fluid flow rate of cleaning fluids), the flow of cleaning fluids might not be able to bend the first membrane 150 and the second membrane 350, thus preventing from cleaning fluids flow into internal vessel cavity 12. Reducing the sealing capabilities of the sealing valve 100 as disclosed above can be beneficial, such as in cases when the flow-induced pressure gradient is low (e.g., low flow rate), thus allowing cleaning fluids passage through the opening(s) in order to wash the internal vessel cavity 12 of container-sealing assembly 200.

Figure 20A:
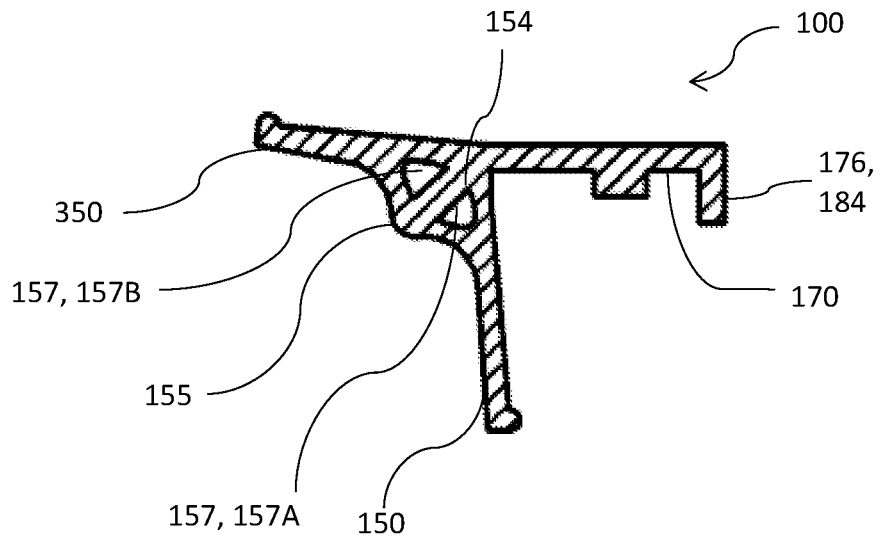
FIGS. 20A-B show cross-sectional views of sealing valve 100 provided with the first membrane and the second membrane extending at various angles in a peripheral free state, according to some implementations.
Figure 20B:
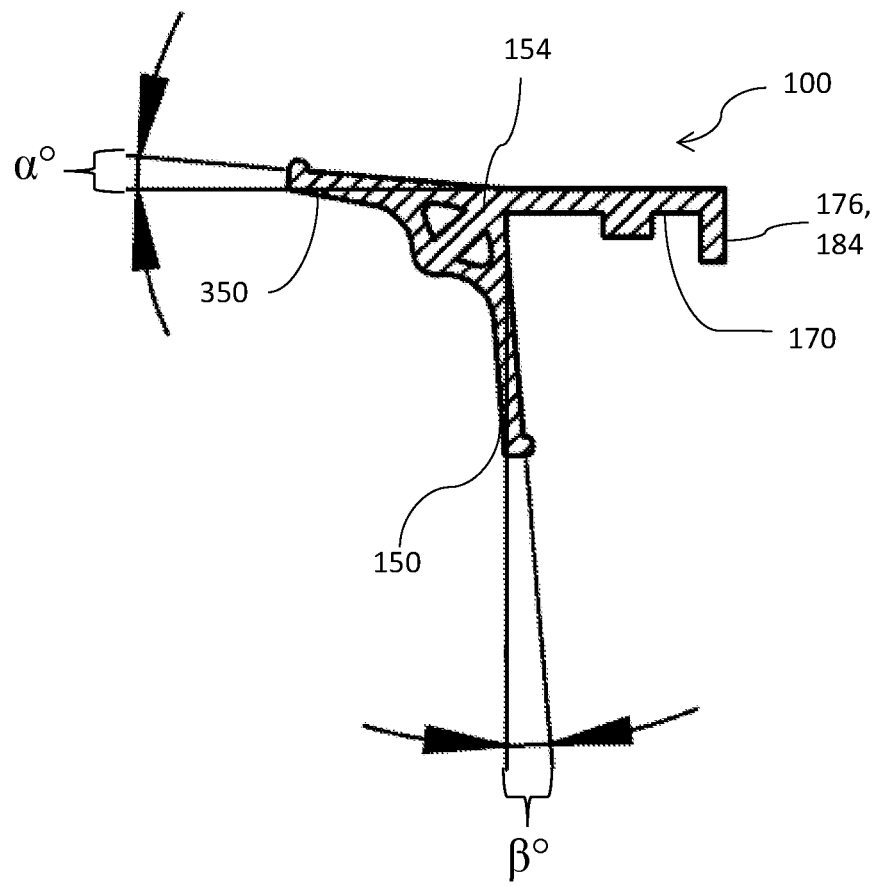

Reference is now made to FIGS. 20A-B. FIGS. 20A-B show cross-sectional views of sealing valve 100, according to some implementations.

Sealing valve 100 of FIGS. 20A-B is similar to sealing valve 100 of FIG. 19 and share many common features as can be appreciated by the skilled in the art. Specific features or components are described below.

Thus, FIGS. 20A-B shows exemplary alternative implementations of some components of sealing valve 100. Specifically, sealing valve 100 of FIGS. 20A-B represent different embodiments of the first membrane 150 and the second membrane 350 extending at various angles in a peripheral free state.

According to some embodiments, in a peripheral free state when sealing valve 100 is not assembled within container-sealing assembly 200, the first membrane 150 is configured to extend at an angle $\beta°$ relative to the longitudinal plane, while the second membrane 350 is configured to extend at an angle $\alpha°$ relative to the lateral plane. According to further embodiments, when sealing valve 100 is assembled within container-sealing assembly 200 (i.e., between container wall 290 and container cover 210), first membrane 150 is flush with container wall 290 along the longitudinal plane, and second membrane 350 is flush with container cover 210 along the lateral plane, due to the resilient flexible characteristics of the first and second membranes, 150 and 350, respectively, as disclosed above.

According to some embodiments, the angle $\beta°$ and the angle $\alpha°$ are identical to each other. According to other embodiments, the angle $\beta°$ and the angle $\alpha°$ are different from each other. According to some embodiments, $\alpha°$ is not equal to (3°. According to some embodiments, $\alpha°$ differs from (3° by at least 2°, at least 4°, at least 6°, at least 8° or at least 10°. Each possibility represents a separate embodiment of the present invention. According to some embodiments, the angle $\beta°$ and/or the angle $\alpha°$ are selected from the range of 0.1° to 45°. According to further embodiments, the angle $\beta°$ and/or the angle $\alpha°$ are selected from the range of 1° to 20°.

Without wishing to be bound by any theory or mechanism of action, it is suggested that the first membrane 150 extending at the angle $\beta°$ relative to the longitudinal plane (in a peripheral free state) can enhance the ability of the first membrane 150 to make the spontaneous transition from the first bent state to the first sealed state, when sealing valve 100 is assembled within container-sealing assembly 200 and the flow-induced pressure gradient is no longer applied thereto. Furthermore, it is suggested that the second membrane 350 extending at the angle $\alpha°$ relative to the lateral plane (in a peripheral free state) can enhance the ability of the second membrane 350 to make the spontaneous transition from the second bent state to the second sealed state, when sealing valve 100 is assembled within container-sealing assembly 200 and the flow-induced pressure gradient is no longer applied thereto. Advantageously, it is suggested that providing the first membrane 150 and the second membrane 350 extending at angle $\beta°$ and angle $\alpha°$, respectively, relative to their respective planes in a peripheral free state, can enhance the hermetical sealing capabilities of the sealing valve 100 when it is assembled within container-sealing assembly 200.

Figure 21:
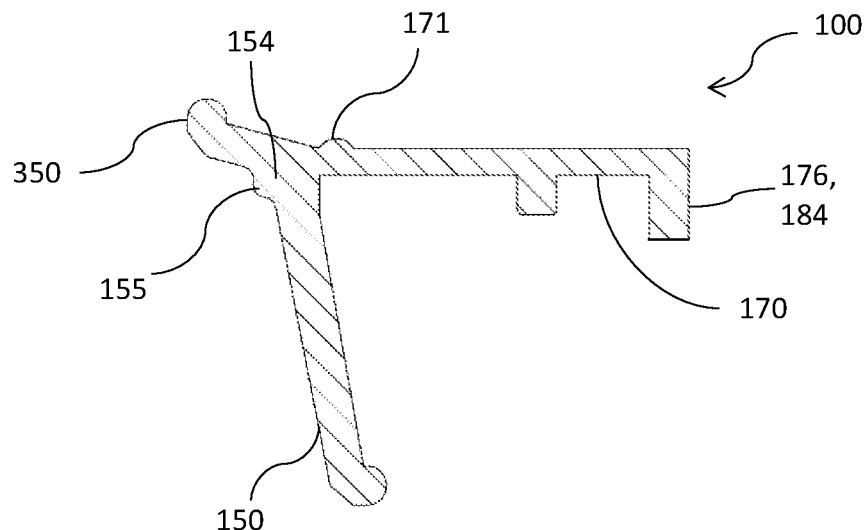
FIG. 21 shows a cross-sectional view of sealing valve 100 provided with anchoring membrane comprising at least one protrusion, according to some implementations.

Reference is now made to FIG. 21. FIG. 21 shows a cross-sectional view of sealing valve 100, according to some implementations.

Sealing valve 100 of FIG. 21 is similar to sealing valve 100 of FIGS. 20A-B (without the inner channel(s) 157) and share many common features as can be appreciated by the skilled in the art. Specific features or components are described below.

Thus, FIG. 21 show exemplary alternative implementations of some components of sealing valve 100. Specifically, sealing valve 100 of FIG. 21 represent different embodiments of anchoring membrane 170 comprising at least one protrusion 171.

According to some embodiments, the anchoring membrane 170 comprises at least one protrusion 171 extending away therefrom along the lateral plane, in the direction of the container cover 210. According to some embodiments, said at least one protrusion 171 is extending around longitudinal centerline 70 along the anchoring membrane 170. According to some embodiments, the at least one protrusion 171 is protruding from the anchoring membrane 170 and extending around longitudinal centerline 70 along anchoring membrane 170.

According to some embodiments, the at least one protrusion 171 is protruding from the anchoring membrane 170, so that the at least one protrusion 171 is closer to the membrane juncture 154 than the anchoring membrane extension flange 184. According to some embodiments, the at least one protrusion 171 is protruding from the anchoring membrane 170 in the vicinity the membrane juncture 154.

As used herein, the term "vicinity" in the context of the distance between the at least one protrusion 171 and the membrane juncture 154, refers to a length of less than 20%, alternatively less than 10%, or optionally less than 5%, of the length of the anchoring membrane 170.

According to some embodiments, the at least one protrusion 171 has a round or curvilinear shape.

According to some embodiments, the at least one protrusion 171 is not configured to be inserted into a corresponding container recess (e.g., similar to container recess 222) in container cover 210. According to some embodiments, container cover 210 does not comprise a corresponding container recess to the at least one protrusion 171.

According to some embodiments, when sealing valve 100 is assembled within to container-sealing assembly 200, the at least one protrusion 171 is protruding from the anchoring membrane 170 in the vicinity the membrane juncture 154 and is configured to be pressed against container cover 210, for providing enhanced sealing between the sealing valve 100 and the container cover 210. According to some embodiments, the at least one protrusion 171 is elastic and resiliently compressible. The elastic and resilient compressibility characteristics of the at least one protrusion 171 can potentially improve retention and hermetic sealing of the sealing valve 100 against the container cover 210, and therefore prevent fluid leakage therebetween, during fluid flow through at least one cover opening 218 while the second membrane 350 is bending away therefrom.

Without wishing to be bound by any theory or mechanism of action, it is suggested that when sealing valve 100 is assembled within container-sealing assembly 200, the at least one protrusion 171 is protruding from the anchoring membrane 170 in the vicinity the membrane juncture 154 and it is resiliently compressed against the container cover 210, thus forming improved retention and uniform hermetic sealing of the sealing valve 100 against the container cover 210. Such improved sealing against the container cover 210 can be useful, such as in cases in which the container cover 210 is especially large and/or heavy, and does not comprise a container recess. It is suggested, according to some embodiments, that when the container cover 210 is especially large and/or heavy, it can be difficult to insert an anchoring membrane protrusion (e.g., protrusion 171) into a corresponding container recess in the container cover 210, and therefore the utilization of the at least one protrusion 171 can improve the sealing of the sealing valve 100 against the container cover 210 as disclosed above.

Figure 22:
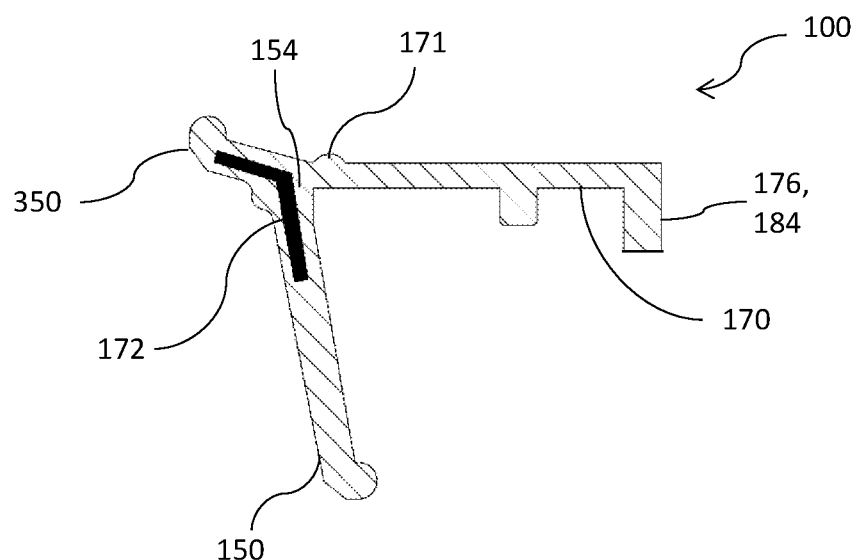
FIG. 22 shows a cross-sectional view of sealing valve 100 provided with an elastic element disposed within the membrane juncture, according to some implementations.

Reference is now made to FIG. 22. FIG. 22 shows a cross-sectional view of sealing valve 100, according to some implementations.

Sealing valve 100 of FIG. 22 is similar to sealing valve 100 of FIG. 21 and share many common features as can be appreciated by the skilled in the art. Specific features or components are described below.

Thus, FIG. 22 show exemplary alternative implementations of some components of sealing valve 100. Specifically, sealing valve 100 of FIG. 22 represent different embodiments of the membrane juncture 154 comprising at least one elastic element 172 disposed therewithin.

According to some embodiments, the membrane juncture 154 comprises at least one elastic element 172 disposed therewithin and extending at least partially along the membrane juncture 154. According to some embodiments, the membrane juncture 154 comprises at least one elastic element 172 disposed therewithin and extending radially along the entire length of the membrane juncture 154 of sealing valve 100. According to some embodiments, the at least one elastic element 172 is extending radially around longitudinal centerline 70 and is disposed within sealing valve 100.

According to some embodiments, the at least one elastic element 172 extends from the membrane juncture 154 at least partially into a portion of the second membrane 350. According to some embodiments, the at least one elastic element 172 extends from the membrane juncture 154 at least partially into a portion of the first membrane 150. According to some embodiments, the at least one elastic element 172 is disposed within sealing valve 100, and extends from a portion of the first membrane 150 through the membrane juncture 154 and into a portion of the second membrane 350. In further embodiments, the at least one elastic element 172 extends from the first membrane 150, through the membrane juncture 154, and into the second membrane 350.

According to some embodiments, the at least one elastic element 172 comprises a resilient and flexible material. According to some embodiments, the at least one elastic element 172 comprises a metal or a metal alloy. According to some embodiments, the at least one elastic element 172 comprises an elastomeric metal or a metal alloy. The metal can comprise stainless steel or an alloy thereof. According to some embodiments, the at least one elastic element 172 comprises a spring, wherein the spring can be optionally made from an elastomeric metal or a metal alloy.

According to some embodiments, the at least one elastic element 172 comprises natural or synthetic fibers, selected from cotton, nylon, Kevlar, combinations thereof, or any other suitable fiber known in the art. The fibers can be in the form of a knitted or a woven fabric. According to some embodiments, the at least one elastic element 172 comprises an elastomeric metal or a metal alloy and a fabric.

According to some embodiments, the at least one elastic element 172 is configured to be compressed without being permanently deformed (e.g., without experiencing plastic deformation) when the above-mentioned flow-induced pressure gradient is applied on the first and second membranes, 150 and 350, respectively. According to further embodiments, the at least one elastic element 172 is further configured to return to its original resilient shape when the flow-induced pressure gradient is no longer applied on the first and second membranes, 150 and 350, respectively. Without wishing to be bound by any theory or mechanism of action, it is suggested that the at least one elastic element 172 disposed within sealing valve 100 as disclosed above can enhance the ability of the first and second membranes, 150 and 350, respectively, to transition from the bent states to the sealed states, when the flow-induced pressure gradient is no longer applied thereto. Advantageously, it is suggested that the at least one elastic element 172 can enhance the hermetical sealing capabilities of the sealing valve 100 when it is assembled within container-sealing assembly 200, due to its resilient and flexible characteristics.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although the invention is described in conjunction with specific embodiments thereof, it is evident that numerous alternatives, modifications and variations that are apparent to those skilled in the art may exist. It is to be understood that the invention is not necessarily limited in its application to the details of construction and the arrangement of the components and/or methods set forth herein. Other embodiments may be practiced, and an embodiment may be carried out in various ways. Accordingly, the invention embraces all such alternatives, modifications and variations that fall within the scope of the appended claims.

The invention claimed is:

1. A tubular seal for sealing between a wall and a cover of a cylindrical container, wherein the seal extends around a centerline and longitudinally between a proximal end and a distal end, wherein the seal comprises:
   a membrane juncture extending around the centerline;
   a first membrane extending distally from the membrane juncture;
   a second membrane extending radially inward from the membrane juncture; and
   an anchoring membrane extending radially outward from the membrane juncture;
   wherein when the seal is positioned between the wall and the cover and no pressure is applied there against, each of the second membrane and the anchoring membrane is configured to seal against the cover, and the first membrane is configured to seal against the wall;
   wherein the first membrane is made of a resilient flexible material so as to bend inward toward the centerline when flow-induced pressure gradient is applied thereto by fluid flowing in the inward direction and to spontaneously restore the sealing against the wall, when the flow-induced pressure gradient ceases; and the second membrane is made of a resilient flexible material so as to bend distally when flow-induced pressure gradient is applied thereto by fluid flowing in the distal direction and to spontaneously restore the sealing against the cover, when the flow-induced pressure gradient ceases.

2. The seal of claim 1, wherein the anchoring membrane is configured to seal against each of the wall and the cover.

3. The seal of claim 1, wherein the anchoring membrane comprises a flange configured to anchor the seal to recess in the container wall, a recess in the container cover, or both, wherein the flange is extending around the centerline along the anchoring membrane.

4. The seal of claim 1, wherein the first membrane is configured to alternately transition between a first sealing state, in which it seals against the wall when flow-induced pressure is not applied thereto and a first bent state, in which it is bent radially inward, when flow-induced pressure gradient is applied thereto by fluid flowing in the radial inward direction, for a plurality of times; and wherein the second membrane is configured to alternately transition between a second sealing state, in which it seals against the cover when flow-induced pressure is not applied thereto and a second bent state, in which it is bent radially outward and distally, when flow-induced pressure gradient is applied thereto by fluid flowing in the distal direction, for a plurality of times, wherein the anchoring membrane is configured to seal against each of the wall and the cover during each of the first sealing state, second sealing state, first bent state and second bent state.

5. The seal of claim 1, wherein the first membrane comprises a first membrane lip at its distal end and wherein the second membrane comprises a second membrane lip at its internal end, wherein each membrane lip is individually selected from the group consisting of flat membrane lip, rounded membrane lip, serrated membrane lip and square membrane lip, wherein the second membrane and the anchoring membrane are extending along a lateral plane and the first membrane extends along a longitudinal plane, perpendicular thereto.

6. The seal of claim 5, wherein when the seal is positioned between the wall and the cover, the second membrane and the anchoring membrane are flush with the cover along the lateral plane, and the first membrane is flush with the wall along the longitudinal plane, thereby sealing against each of the cover and the wall by the seal, when flow-induced pressure is not applied.

7. The seal of claim 5, wherein the first membrane is tapering distally, so that it is wider at the connection to the membrane juncture than in the first membrane lip; and wherein the second membrane is tapering radially inward in the proximal direction, so that it is wider at the connection to the membrane juncture than in the second membrane lip.

8. The seal of claim 1, wherein when the seal is positioned between the wall and the cover the first membrane has an arched or v-shaped cross section, wherein each of the membrane juncture and first membrane lip is contacting the wall and a portion of the first membrane is not contacting the wall, and the second membrane has an arced or v-shaped cross section, wherein each of the membrane juncture and second membrane lip is contacting the cover and a portion of the second membrane is not contacting the cover.

9. A sealed container, comprising:
   a cylindrical vessel comprising:
      a vessel floor, a vessel cover positioned parallel thereto, and a cylindrical vessel wall positioned perpendicular to the vessel floor and vessel cover, defining an internal cavity, wherein the cover comprises at least one cover opening and wherein the wall comprises at least one wall opening; and the tubular seal of claim 1, positioned between the vessel cover and the vessel wall;

wherein the seal is coaxial with the vessel, wherein the proximal end thereof is in contact with the vessel cover and the distal end thereof is within the internal cavity, wherein the membrane juncture is in contact with the vessel cover, wherein the first membrane is sealing against the at least one wall opening, wherein the second membrane is sealing against the at least one cover opening, wherein the anchoring membrane is positioned out of the internal cavity;

wherein the first membrane is configured to bend inward toward the centerline and the vessel cover when the flow-induced pressure gradient is applied thereto by fluid flowing there against through the at least one wall opening and to spontaneously restore the sealing against the at least one wall opening, when the flow-induced pressure gradient ceases; and the second membrane is configured to bend distally toward the vessel floor when the flow-induced pressure gradient is applied thereto by fluid flowing there against through the at least one cover opening and to spontaneously restore the sealing against the at least one cover opening, when the flow-induced pressure gradient ceases.

10. A sealed container, comprising:

a cylindrical vessel comprising:
  a vessel floor, a vessel cover positioned parallel thereto, and a cylindrical vessel wall positioned perpendicular to the vessel floor and vessel cover, defining an internal cavity, wherein the cover comprises at least one cover opening and wherein the wall comprises at least one wall opening; and a tubular seal positioned between the vessel cover and the vessel wall;

wherein the seal is coaxial with the vessel and extends around a centerline and longitudinally between a proximal end, which is in contact with the vessel cover and a distal end within the internal cavity;

wherein the seal comprises:
  a membrane juncture extending around the centerline and in contact with the vessel cover;
  a first membrane extending distally from the membrane juncture and sealing against the at least one wall opening;
  a second membrane extending radially inward from the membrane juncture and sealing against the at least one cover opening; and
  an anchoring membrane extending radially outward from the membrane juncture out of the internal cavity;
  wherein the first membrane is made of a resilient flexible material so as to bend inward toward the centerline when flow-induced pressure gradient is applied thereto by fluid flowing in the inward direction through the at least one wall opening and to spontaneously restore the sealing against the at least one wall opening, when the flow-induced pressure gradient ceases; and the second membrane is made of a resilient flexible material so as to bend distally when flow-induced pressure gradient is applied thereto by fluid flowing in the distal direction through the at least one cover opening and to spontaneously restore the sealing against the at least one cover opening, when the flow-induced pressure gradient ceases.

11. The sealed container of claim 10, wherein the vessel floor is connected to the cylindrical wall and the vessel cover is removable from the cylindrical wall.

12. The sealed container of claim 10, wherein the cylindrical wall comprises a plurality of wall openings, each of which is sealed by the first membrane.

13. The sealed container of claim 10, wherein the vessel cover comprises a plurality of cover openings, each of which is sealed by the second membrane.

14. The sealed container of claim 10, wherein the anchoring membrane is positioned between the vessel cover and the vessel wall.

15. The sealed container of claim 14, wherein the anchoring membrane is sealing against both the vessel cover and the vessel wall, such that an interface between the vessel cover and the vessel wall is sealed.

16. The sealed container of claim 14, wherein the vessel cover comprises a cover recess at a distal surface thereof and the anchoring membrane comprises a second flange positioned at least partially within said cover recess, to anchor the seal to the container cover, wherein the second flange is protruding from the anchoring membrane and extending around the centerline along the anchoring membrane.

17. The sealed container of claim 15, wherein the vessel wall comprises a wall recess at a proximal end thereof and the anchoring membrane comprises a first flange positioned at least partially within said wall recess, to anchor the seal to the container wall, wherein the first flange is protruding from the anchoring membrane and extending around the centerline along the anchoring membrane.

18. The sealed container of claim 10, wherein the first membrane is configured to alternately transition between a first sealing state, in which it seals against the at least one wall opening when flow-induced pressure is not applied thereto through the at least one wall opening, and a first bent state, in which it is bent radially inward and toward the vessel cover, when flow-induced pressure gradient is applied thereto by fluid flowing through the at least one wall opening, for a plurality of times; and wherein the second membrane is configured to alternately transition between a second sealing state, in which it seals against the at least one cover opening when flow-induced pressure is not applied thereto through the at least one cover opening, and a second bent state, in which it is bent radially distally toward the vessel floor, when flow-induced pressure gradient is applied thereto by fluid flowing through the at least one cover opening, for a plurality of times, wherein the anchoring membrane is sealing against both the vessel cover and the vessel wall, such that an interface between the vessel cover and the vessel wall is sealed during each of the first sealing state, second sealing state, first bent state and second bent state.

19. The sealed container of claim 10, wherein the first membrane comprises a first membrane lip at its distal end, wherein when the first membrane is bent inward, the first membrane lip is not contacting the vessel wall and when the sealing against the wall is restored, the first membrane lip is contacting the vessel wall.

20. The sealed container of claim 19, wherein each membrane lip is individually selected from the group consisting of flat membrane lip, rounded membrane lip, serrated membrane lip and square membrane lip.

* * * * *